(12) United States Patent
Deng et al.

(10) Patent No.: US 10,996,012 B2
(45) Date of Patent: May 4, 2021

(54) FIREARM USAGE MONITORING SYSTEM

(71) Applicant: Armaments Research Company Inc., Bethesda, MD (US)

(72) Inventors: William Deng, Seattle, WA (US); Michael Canty, Seattle, WA (US)

(73) Assignee: Armaments Research Company Inc., Bethesda, MD (US)

(*) Notice: Subject to any disclaimer, the term of this patent is extended or adjusted under 35 U.S.C. 154(b) by 6 days.

(21) Appl. No.: 16/460,357

(22) Filed: Jul. 2, 2019

(65) Prior Publication Data

US 2020/0011629 A1    Jan. 9, 2020

Related U.S. Application Data

(63) Continuation of application No. PCT/US2018/015614, filed on Jan. 27, 2018, which
(Continued)

(51) Int. Cl.
*F41A 17/06* (2006.01)
*H04N 5/232* (2006.01)
(Continued)

(52) U.S. Cl.
CPC ....... *F41A 17/063* (2013.01); *H04N 5/23203* (2013.01); *H04N 5/28* (2013.01); *F41A 19/01* (2013.01); *G01S 19/13* (2013.01)

(58) Field of Classification Search
CPC ... F41A 17/063; F41A 19/01; H04N 5/23203; H04N 5/28; G01S 19/13
(Continued)

(56) References Cited

U.S. PATENT DOCUMENTS 6,412,207 B1 * 7/2002 Crye ............. F41A 17/02
42/70.01
8,339,257 B2 * 12/2012 Cazanas ............. F41A 19/01
340/539.1
(Continued)

OTHER PUBLICATIONS

International Search Report and Written Opinion for International Application No. PCT/US2018/015614 dated Jun. 14, 2018.

*Primary Examiner* — Samir Abdosh
(74) *Attorney, Agent, or Firm* — RMCK Law Group PLC

(57) ABSTRACT

A firearm usage monitoring system configured to store data about location, movement, orientation, and direction of a firearm while in use and includes a hard-wired data and power connection, configured to receive data and power from a wired source. A serial communication system is communicatively coupled to the data and power connection and configured to send data to and receive data from the data and power connection. A microprocessor sends data to and receives data from the serial communication system. A motion monitor is communicatively coupled to the microprocessor module further comprising a gyroscope, an accelerometer and a compass configured to communicate data about movement, orientation, and direction of the firearm. Memory is communicatively coupled to the microprocessor and the motion monitor. Data about the location and position of the firearm in 3D space is transmitted from the motion monitor and GPS and then stored in the memory.

16 Claims, 12 Drawing Sheets

Related U.S. Application Data is a continuation-in-part of application No. 14/666,008, filed on Mar. 23, 2015, now abandoned.

(60) Provisional application No. 62/451,620, filed on Jan. 27, 2017, provisional application No. 61/969,009, filed on Mar. 21, 2014.

(51) Int. Cl.
*H04N 5/28* (2006.01)
*F41A 19/01* (2006.01)
*G01S 19/13* (2010.01)

(58) Field of Classification Search
USPC .......................................................... 42/1.01
See application file for complete search history.

(56) References Cited

U.S. PATENT DOCUMENTS

| | | | |
|---|---|---|---|
| 9,140,509 B2 * | 9/2015 | Sullivan | F41A 35/00 |
| 10,436,534 B2 * | 10/2019 | Stewart | H04W 4/02 |
| 10,460,590 B2 * | 10/2019 | Strack | G08B 25/016 |
| 10,578,403 B2 * | 3/2020 | Kapogianis | F41C 27/00 |
| 2004/0200109 A1 | 10/2004 | Vasquez | |
| 2009/0277065 A1 | 11/2009 | Clark et al. | |
| 2010/0265071 A1 * | 10/2010 | August | F41A 35/00 340/572.7 |
| 2011/0025491 A1 * | 2/2011 | Cazanas | F41A 19/01 340/539.1 |
| 2011/0252684 A1 | 10/2011 | Ufer et al. | |
| 2014/0290109 A1 * | 10/2014 | Stewart | F41A 17/063 42/70.01 |
| 2014/0366419 A1 * | 12/2014 | Allan | F41A 17/063 42/70.06 |
| 2014/0378088 A1 * | 12/2014 | Goel | F41A 19/01 455/404.2 |
| 2016/0033221 A1 | 2/2016 | Schmehl et al. | |
| 2016/0173832 A1 * | 6/2016 | Stewart | F41A 35/00 348/158 |
| 2018/0274876 A1 * | 9/2018 | Stewart | H04N 7/185 |
| 2019/0293375 A1 * | 9/2019 | Urwin-Wright | F41A 17/08 |
| 2020/0003511 A1 * | 1/2020 | Deng | F41A 17/06 |
| 2020/0011629 A1 * | 1/2020 | Deng | H04N 5/28 |

* cited by examiner

FIREARM USAGE MONITORING SYSTEM

CROSS-REFERENCE TO RELATED APPLICATION(S)

This application is a bypass continuation of International Patent Application No. PCT/US2018/015614, filed Jan. 27, 2018, which claims the benefit of U.S. Provisional Patent Application Ser. No. 62/451,620, filed Jan. 27, 2017, which is a continuation-in-part of U.S. patent application Ser. No. 14/666,008, filed on Mar. 23, 2015, which claims priority to U.S. Provisional Patent Application Ser. No. 61/969,009, filed on Mar. 21, 2014. Each of the above-identified applications is hereby incorporated by reference in its entirety.

BACKGROUND

Typically, firearm tracking systems have been very limited, often requiring complex manufacturing steps in order to enable a determination of whether a weapon has been used. These systems typically have issues with reliability, have poor performance (e.g., short battery life), lack the ability to add new features, and suffer other limitations.

The use of excessive force continues to be reported by the mainstream media and news, increasing the need for transparency and objective data collection. With the rise of smartphones and video recording, acts of violence are being documented and displayed instantly to millions of viewers. Police managers are often unable to prove a statement until hours or days after an incident, at which time many citizens have already drawn conclusions of the incident. This can lead to police mistrust and a call for accountability. Federal mandates have been issued in an effort to reestablish trust among the community and ensure that justice is served resulting in increased body camera adoption rates. Several issues have arisen with the use of body cameras, however, not only are body cameras expensive, officers have reported issues with functionality (e.g., they tend to fall off), and they have notoriously been known to fail to record when an incident occurs. This can force management and officers to return to self-reporting, which is a method entirely reliant on the individual. Uses of lethal force have also been known to go unreported, even when there is a loss of life. These issues and the lack of transparency provide an opening for a technological solution. Despite these issues, parties that use firearms, such as police (and other first responders), soldiers, security personnel, and others, are increasingly equipped with body cameras and other systems for tracking their locations and recording their activities, such as body cameras and other cameras and sensors that are installed in various locations throughout municipalities. The information collected can be used by dispatchers, command personnel, supervisors, investigators, insurers, risk managers, underwriters, and various other parties, such as to direct activities, provide forensic analysis, provide evidence, assist with training and risk management, assist with underwriting insurance policies, and many other purposes. However, body cameras are subject to significant limitations, including difficulty storing enough data and significant expenses involved in transmitting data from a camera over a network. Accordingly, a need exists for improved systems that involve recording and tracking activities of individuals, including more advanced methods and systems for tracking discharges from firearms and more advanced methods for taking advantage of available recording systems, such as body cameras.

SUMMARY

A firearm usage monitoring system is configured to store data about location, movement, orientation, and direction of a firearm while in use and includes a hard-wired data and power connection, configured to receive data and power from a wired source. A serial communication system (e.g., a UART to USB controller) is communicatively coupled to the hard-wired data and power connection and configured to send data to and receive data from the hard-wired data and power connection. A microprocessor is configured to send data to and receive data from the serial communication system. A nine-axis motion monitor is communicatively coupled to the microprocessor module further comprising a tri-axis gyroscope, a tri-axis accelerometer and a tri-axis compass configured to communicate data about movement, orientation, and direction of the firearm. Memory is communicatively coupled to the microprocessor and to the nine-axis motion monitor. Data about the location and position of the firearm in 3D space is transmitted from the nine-axis motion monitor and GPS and then stored in the memory.

In embodiments, a firearms activity monitoring system is provided, comprising a series of ruggedized sensors, configured to be built into the grips of a firearm, dedicated to providing real-time firearms activity monitoring, including firearm location, orientation, and discharge monitoring. In embodiments, the system is an "install and forget" device, independent of the firing mechanism (that is, in such embodiments, the system does not prevent discharges), that collects objective data on firearms usage and orientation. In turn, the data collected has a host of applications among security forces, ranging from augmenting critical first response systems to minimizing response times and improving situational awareness, to machine learning in automating radio transmissions and predictive firearm maintenance. Inventory control and firearms accountability are also possibilities with this potentially life-saving technology. This device brings the Internet-of-Things (IoT) into the world of firearms. In embodiments, a firearms activity monitoring system may be combined with other functionality that may prevent discharges through methods such as trigger locks, barrel blocks, etc. and require user identification such as biometric fingerprint scanners, palm recognition, and RFID scanners The firearms activity monitoring system allows various parties, such as managers and supervisors, to collect objective, rather than subjective, firearms data. This allows better oversight and accountability of all firearms usage. This includes the capability of the technology to report information in real-time, allowing the rapid use of the collected information, such as for situational awareness and rapid response to critical situations. By collecting real-time firearms data, managers, dispatchers, and the like can respond more efficiently to incidents and also provide accurate reporting of information after an incident involving a firearm.

As noted above, the expensive price tag associated with hardware, storage, and data transmission fees has resulted in identification of cost as a problem with other monitoring systems like body cameras that have been adopted due to public pressure. The firearm monitoring systems disclosed herein augment other systems like body cameras and can render such systems much more cost-effective.

As noted above, for insurance companies, firearms used by the client represent a liability. In embodiments, data from the firearm monitoring system may be used to help companies that provide insurance (such as to private security firms); for example, it may be possible to negotiate a lower insurance premium as a result of using a monitoring system that demonstrates effectiveness and completion of training, adherence to safe practices, and the like by the personnel of the insured. With a device that increases accountability and inventory management, the risks and costs associated with insuring security firms decreases, thereby creating cost savings for both insurance companies and security firms.

In embodiments, the present disclosure includes a system for monitoring a user of a firearm. The system includes an inertial measurement unit configured to be disposed inside a grip of the firearm for measuring the motion of the firearm. The system also includes an event detection system for detecting a detected event that includes at least one of gripping of the firearm, raising of the firearm, aiming of the firearm, and discharging of the firearm based on the motion of the firearm as measured by the inertial measurement unit. The system further includes a communication system for wirelessly communicating the detected event.

In embodiments, the detected event is communicated to a camera system.

In embodiments, the camera system includes a camera located in sufficient proximity to view the firearm.

In embodiments, the camera system includes a body camera system worn by the user of the firearm.

In embodiments, the body camera initiates recording upon receiving the communication of the detected event.

In embodiments, the body camera initiates recording upon the firearm being at least one of gripped, raised and aimed.

In embodiments, the event detection system and the communication system are configured to be disposed inside the grip of the firearm.

In embodiments, the inertial measurement unit is configured to count each discharge of the firearm.

In embodiments, the system of the present disclosure includes a firearm usage tracking system configured to detect the firearm being pointed toward another firearm or a user in conjunction with supporting systems.

In embodiments, the system of the present disclosure includes a firearm usage tracking system configured to detect the firearm and at least another firearm and configured to visually display locations of the at least two firearms.

In embodiments, the system of the present disclosure includes a firearm usage tracking system configured to detect a set of firearms in an inventory, to count each discharge of each of the firearms in the set of firearms, and to communicate total discharges from each of the firearms.

In embodiments, the system of the present disclosure includes a firearm usage tracking system configured to detect a set of firearms in an inventory across a mesh network and to determine a location of a first firearm from the set of firearms based on a detected location of at least a second firearm in the set of firearms.

In embodiments, the present disclosure includes a firearm usage monitoring system configured to store data about movement of a firearm by a user. The system includes a grip on the firearm that is configured to be held by a hand of the user and permit the hand of the user to also reach a trigger of the firearm. The system also includes a nine-axis motion monitor including a microprocessor, a tri-axis gyroscope, a tri-axis accelerometer and a tri-axis compass configured to communicate data about movement, orientation, and direction of the firearm. The system further includes memory communicatively coupled to the microprocessor and to the nine-axis motion monitor and a GPS module connected to the microprocessor and the memory. In embodiments, data about the position of the firearm is transmitted from the nine-axis motion monitor and the GPS module and stored in the memory. In embodiments, the nine-axis motion monitor, the microprocessor, the memory, and the GPS module are configured to be disposed inside a grip of the firearm.

In embodiments, the grip on the firearm is configured to be held by the hand of the user and permit the hand of the user to also reach a safety of the firearm.

In embodiments, the system of the present disclosure includes a hard-wired data and power connection configured to receive data and power from a wired source.

In embodiments, the system of the present disclosure includes a serial communication system (e.g., a UART to USB controller) communicatively coupled to the hard-wired data and power connection and configured to send data to and receive data from the hard-wired data and power connection. In embodiments, the microprocessor is configured to send data to and receive data from the serial communication system.

In embodiments, the system of the present disclosure includes a low dropout regulator electrically coupled to a battery and the serial communication system. In embodiments, the low dropout regulator steps down voltage from the battery to more efficiently power the serial communication system.

In embodiments, the system of the present disclosure includes a camera system that includes a body camera that is activated when there is a change in position of the firearm transmitted from one of the nine-axis motion monitor and the GPS module.

In embodiments, the present disclosure includes a system for monitoring firearms in a set of the firearms. Each of the firearms is associated with a user in a set of users. The system includes a machine learning system and a sensory analysis module that connects to the machine learning system and is configured to receive multi-modal sensory inputs from firearm usage tracking systems associated with the firearms, sensors that detect the users, and sensors that detect an environment around the set of firearms and the set of users. The system includes a set of candidate intents generated by the machine learning system based at least a portion of the multi-modal sensory inputs. The system also includes an action plan based on the set of candidate intents generated by the machine learning system. In embodiments, the action plan is in response to at least one of a change in condition of one of the users of the firearms, change of state of one of the firearms from the set of firearms, a change of environment around the firearms.

In embodiments, the machine learning system is configured to determine that one of the users from the set of users is in distress based at least one sensor detecting human states of the user indicative of distress and at least one firearm sensor that detects motion and orientation of the firearm indicative of lack of discharge for a predetermined period. In embodiments, the action plan from the machine learning system is configured to request assistance for the user in distress.

In embodiments, the machine learning system is configured to activate camera systems in anticipation of an event based at least one sensor detecting human states of the user and at least one firearm sensor that detects motion and orientation of the firearm indicative of imminent discharge of at least one firearm of the set of firearms.

In embodiments, the machine learning system is configured to generate inventory action plans detailing needs for ammunition in anticipation of its consumption by the firearms from the set of firearms based on inertial monitoring units in each of the firearms that detects motion and orientation of the firearm to count each shot based on discharges from the firearms of the set of firearms.

BRIEF DESCRIPTION OF THE FIGURES

The detailed description of some embodiments of the inventions is made below with reference to the accompanying figures, wherein like numerals represent corresponding parts of the figures.

DETAILED DESCRIPTION

Figure 1:
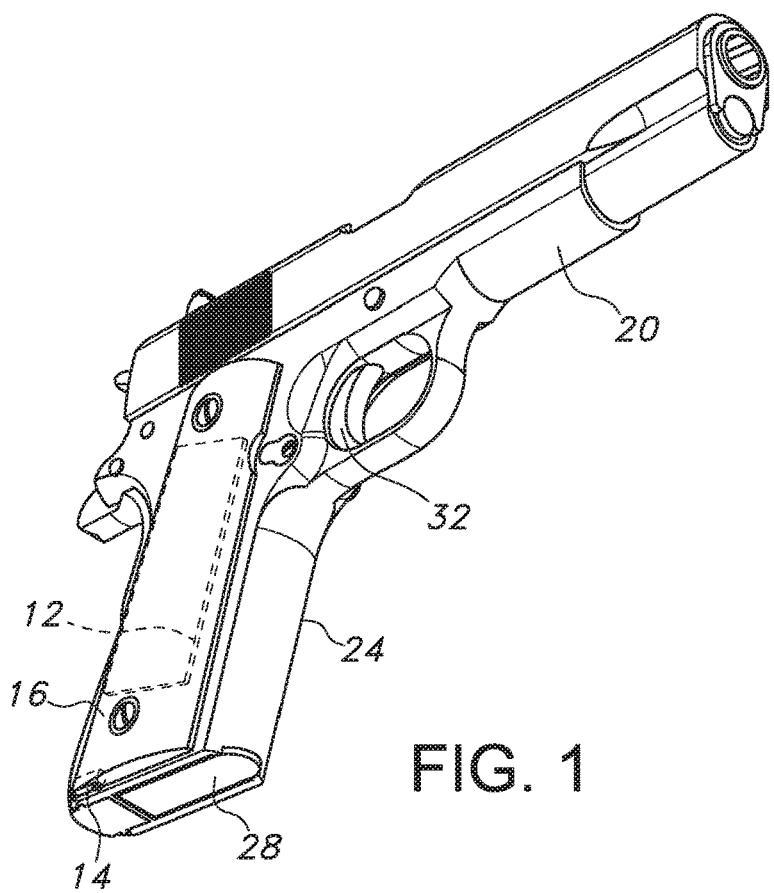
FIG. 1 is a bottom front perspective view of a firearm including a firearm usage monitoring system in accordance with the embodiments of the present disclosure.
Figure 2:
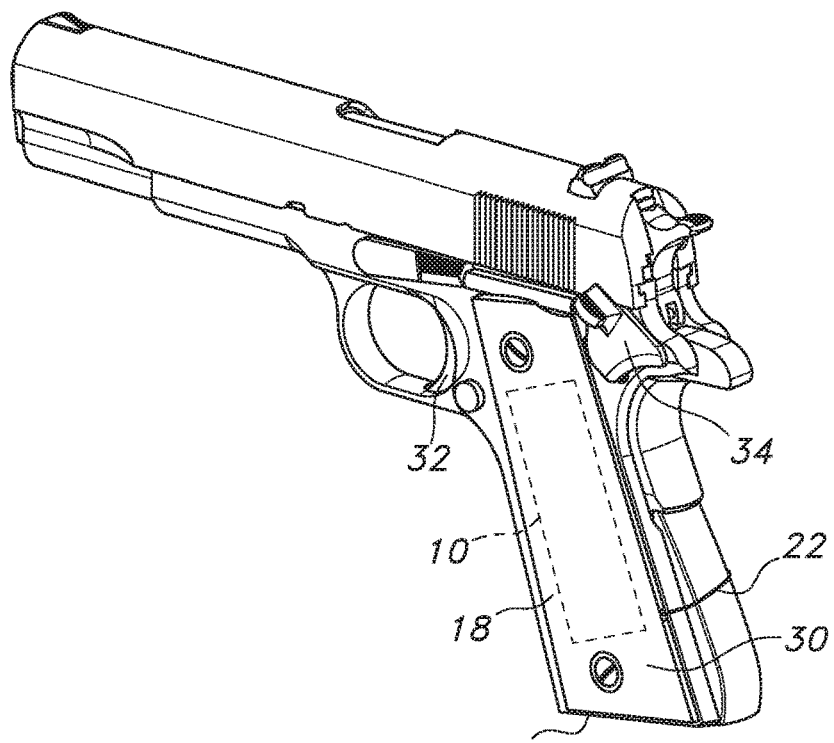
FIG. 2 is a top rear perspective view of the firearm of FIG. 1.
Figure 3:
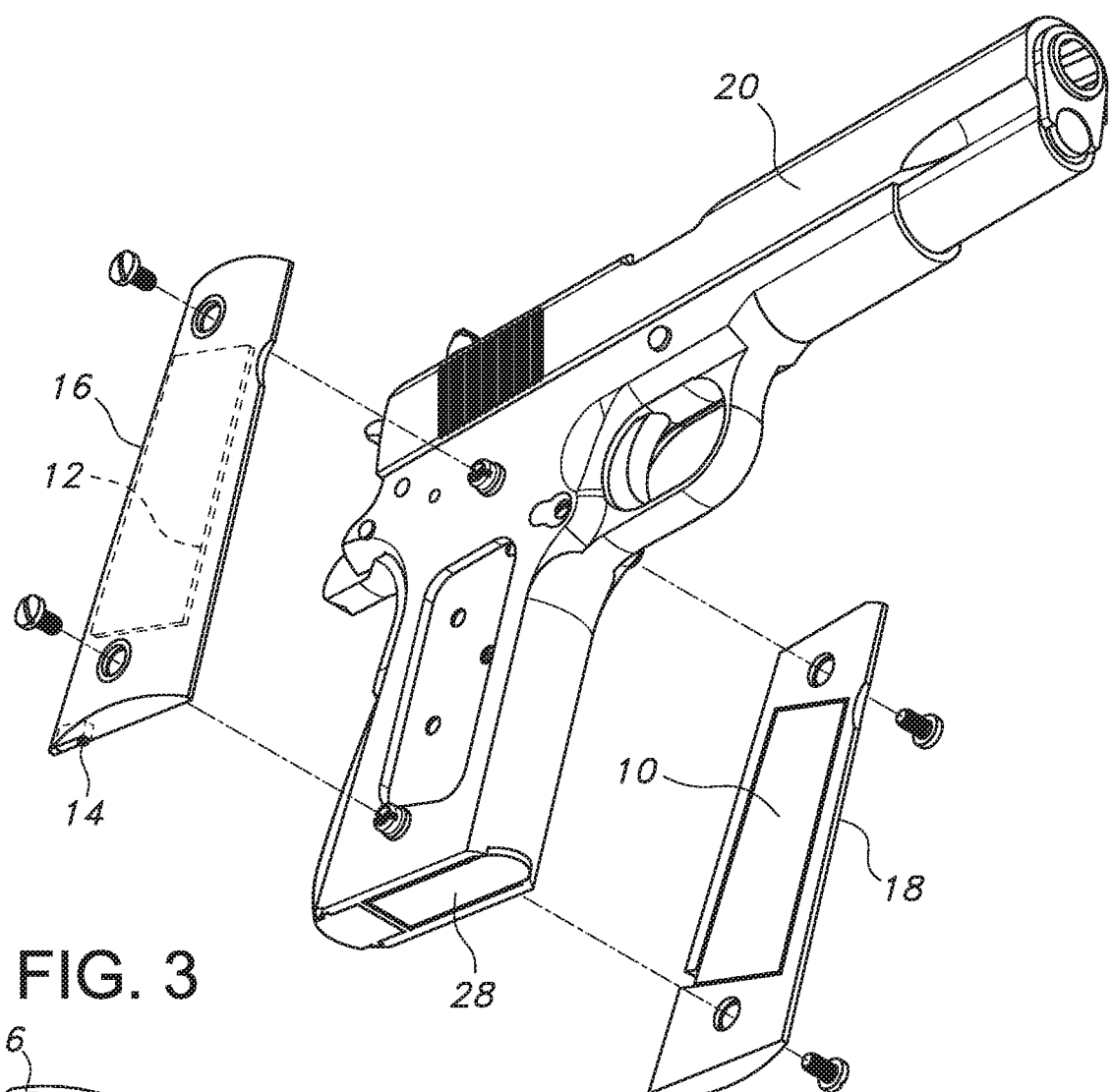
FIG. 3 is an exploded view of the firearm of FIG. 1.
Figure 4:
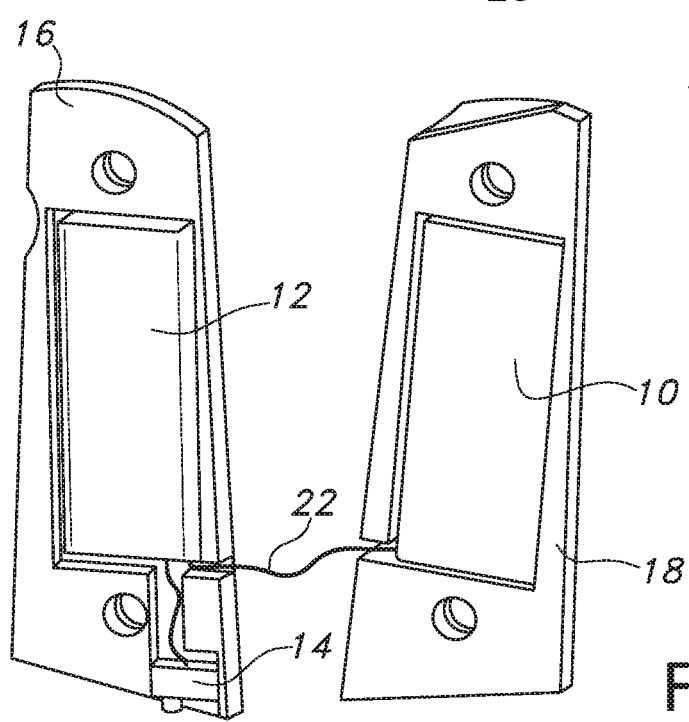
FIG. 4 is a perspective view of first and second grip panels of the firearm and the firearm usage monitor in accordance with embodiments of the present disclosure.

By way of example, and referring to FIG. 1 through FIG. 4, embodiments of the firearm usage monitoring system includes circuit board 10 electrically coupled to battery 12 with connecting wire 22. Battery 12 is electrically coupled to entry point 14. Entry point 14 is configured to receive a hardwire connection for either electrical power or data.

Battery 12 is mounted into first grip panel 16. Circuit board 10 is mounted into second grip panel 18. First grip panel 16 can be joined to second grip panel 18 on firearm 20 to form grip 24. Grip 24 can contain magazine 28 that can contain rounds 30. Trigger 32 can be pulled after safety 34 is released to fire one of the rounds 30 with firearm 20.

Figure 6:
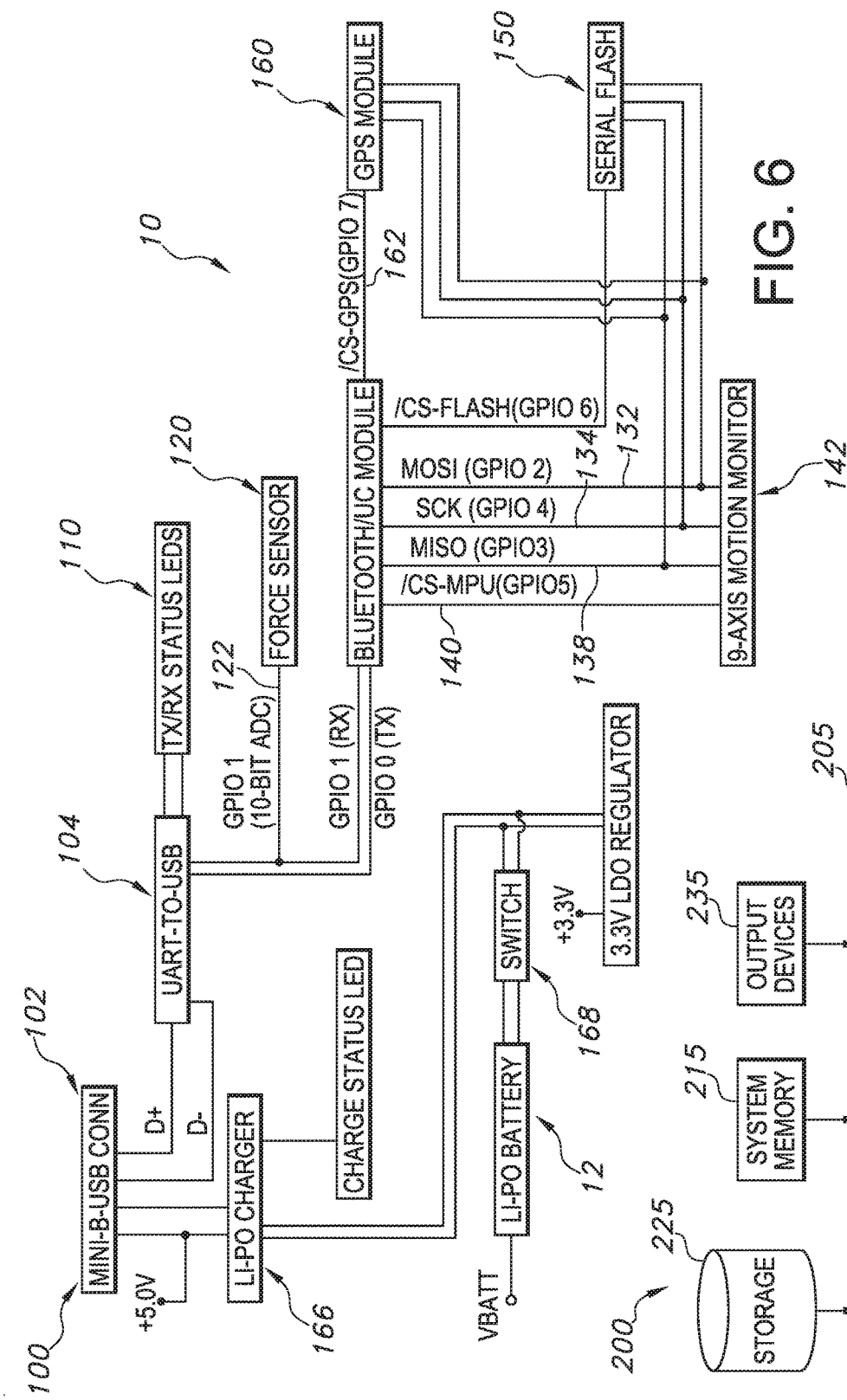
FIG. 6 and FIG. 7 are schematic views of the firearm usage monitoring system in accordance with embodiments of the present disclosure.

Turning to FIG. 6, circuit board 10 can be designed at a high level with functionality have extended battery life and more detailed data recording. The entry point 14 configured as a data connection point is shown here as a mini-B universal service bus (USB) connector 100. When connected to a USB cable this is a hard wired data and power connection 102. The mini-B USB connector 100 is electrically coupled to a USB to serial universal asynchronous receiver/transmitter (UART) controller 104. This UART to USB controller 104 comprises an integrated modem with up to 3M Baud, a virtual communications (COM) port, and a +3.3V level converter that operates on 8 mA or so. For instance, the FT231X integrated circuit meets these specifications. In effect, the UART to USB controller 104 provides functionality to update firmware in the remainder of the system providing for substantially greater upgrades and improvements than other devices in this field. The UART to USB controller 104 is electrically coupled to a transmitter/receiver status light emitting diode (LED) 110 that indicates if a firmware update is occurring.

A force sensor 120 electrically coupled to a first general purpose input/output pin GPIO1 122. The force sensor 120 can be a resistive based force sensor with a voltage divider for analog input. The force sensor 120 will typically draw less than 1 mA of current from the UART to USB controller 104. When force is imparted on the force sensor 120, the circuit board 10 can wake up and begin to operate (or operate beyond minimal operation). The force sensor 120 can be a force sensing resistor. For instance, the FSR 400 single zone force sensing resistor meets these requirements.

The UART to USB controller 104 is electrically coupled to a Bluetooth/uC Module 130. Bluetooth/uC Module 130 is configured to send data to and receive data from the UART to USB controller 104. In some embodiments, Bluetooth/uC Module 130 can be an RFduino stand-alone board which has a powerful ARM Cortex processor and Bluetooth Low-Energy 4.0 built-in. This would typically consume 20 mA peak and 9 mA normal. It is equally possible, that the Bluetooth/uC Module 130 can include two modules: a microprocessor and a communication circuit which can be separated. While a Bluetooth communication circuit may be the easiest way to transmit data, data can also be transmitted through the mini-B USB connector 100. Further, there is any number of possible wireless communication systems that could be used such as radio frequency, Wi-Fi, near field communication and others.

The Master Out Serial In (MOSI) pin GPIO 2 132 on the Bluetooth/uC Module 130, the Data Clock (SCK) pin GPIO 4 134, the Master In Serial Out (MISO) pin GPIO 3 138, and the CS-MPU pin GPI05 140 are electrically coupled to the nine-axis motion monitor 142. The nine-axis motion monitor 142 is configured to measure and transmit data about all of the positioning of the circuit board 10 while in motion of any kind. In many examples, this can include a Tri-axis gyro up to 2000 dps, tri-axis accelerometer up to 16 g, a tri-axis compass up to 4800 uT, and programmable interrupt. This would typically consume 4 mA. For instance, the MPU-9250 provides this functionality. In many examples, this triparate functionality can be necessary to monitor exact orientation and track where the firearm travels in terms of rotation, speed, and direction. In some cases, the tri-axis compass can be accomplished with a magnetometer. Recoil and/or shot count resulting from firearm discharge can be identified from the gathered data.

MISO pin GPIO 3 138, SCK pin GPIO 4 134 and MOSI pin GPIO 2 132 are further electrically coupled to serial flash memory 150. In many examples, serial flash memory 150 should operate in double transfer rate or DTR mode in some cases a gigabyte of memory formed by 256 Mb die, with 100*k* erase cycles per sector. This may draw 6 mA. The serial flash memory 150 is further electrically coupled to CS-Flash pin GPIO 6 152 on the Bluetooth/uC Module 130. For instance, N25Q00AA flash memory meets this requirement.

MISO pin GPIO 3 138, SCK pin GPIO 4 134 and MOSI pin GPIO 2 132 are further electrically coupled to a GPS Module 160. The GPS Module 160 is further electrically coupled to CS-GPS pin GPIO 7 162 on the Bluetooth/uC Module 130. The GPS module 160 is configured to determine position within 2.5 meters of accuracy with a 10 Hz update rate, internal real time clock, onboard read only memory, and −167 dBm sensitivity. This can operate continuously with a draw of 30 mA continuous and 7 mA while in power save mode (1 Hz). For instance, The U-BLOX™ CAM-M8Q chip antenna module meets this requirement. There are a lot of other kinds of GPS systems that could be equally acceptable including Glonass™, Beidou™, etc.

The mini-B USB connector 100 is electrically coupled to the UART to USB controller 104 for sending data D+ and receiving data D−, however, it does not operate on that voltage. Accordingly, circuit 10 needs to have a system that both rapidly charges the battery 12 and permits data exchange. The mini-B USB connector is electrically coupled to a battery charger 166. The battery charger 166 is electrically coupled to battery 12 with a switch 168. The battery charger can be set to 500 mA and include a sense current, reverse discharge protection, and automatically power down. For instance, charger MCP73831 meets these requirements.

FIG. 6 indicates that a lithium polymer battery can be used, but other kinds of batteries can be used as well. One battery 12 that could work would provide 3.7V and have an 850 mAh capacity.

Notably, battery 12 is electrically coupled to a low dropout (LDO) regulator 170. The LDO regulator 170 steps down the voltage from 3.7V to 3.3. V to provide power at a voltage that can be used by the UART to USB controller 104 and the Bluetooth/uC Module 130. The LDO regulator 170 should provide 300 mA output, 270 mV dropout, output fixed at 3.3V, reverse battery protection, with no reverse current, and overcurrent protection. For instance, LDO regulator LT1962 meets these requirements. However, the GPS module would typically operate at 3.7V.

Figure 5:
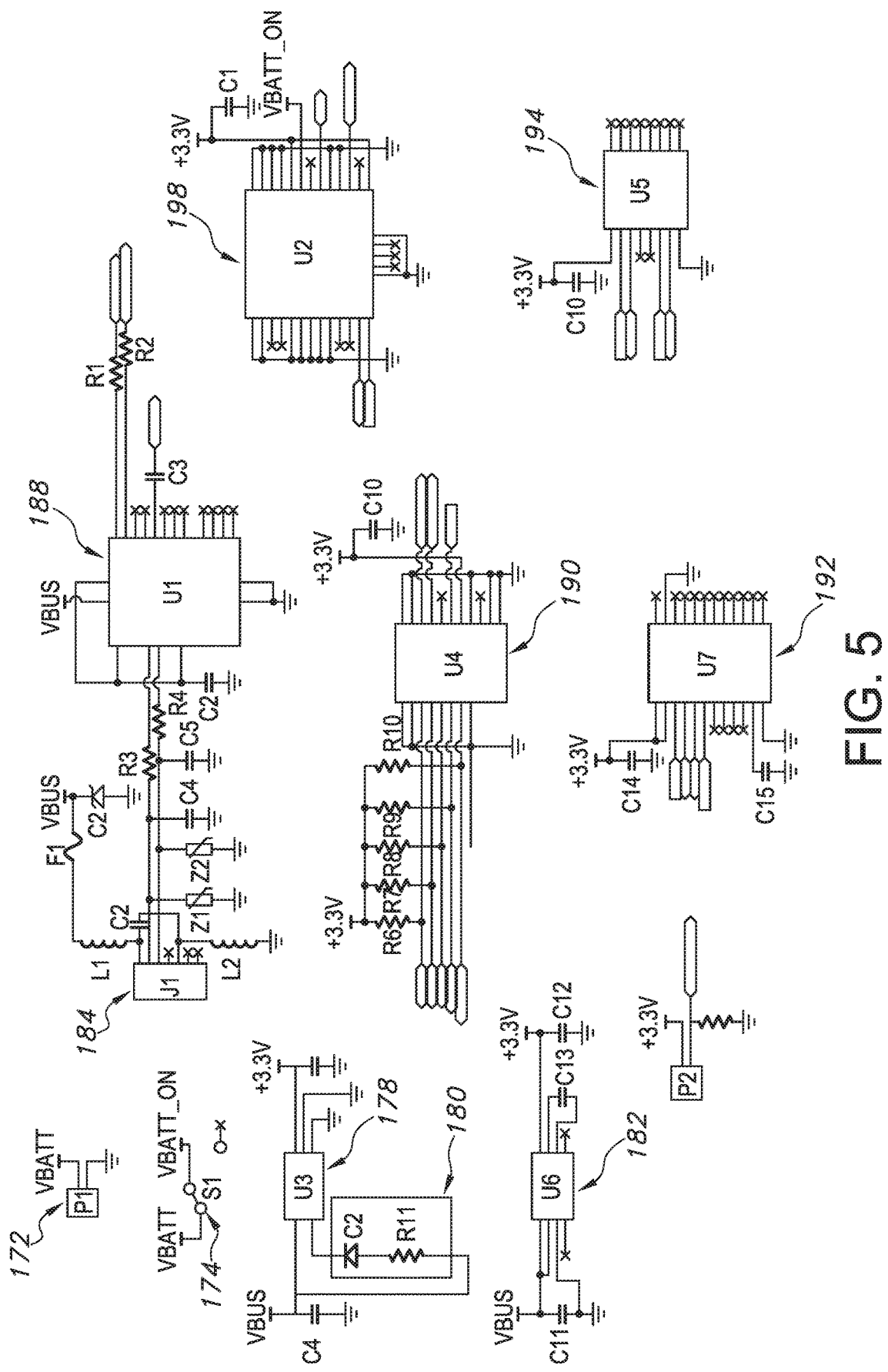
FIG. 5 is an electrical schematic view of the firearm usage monitoring system in accordance with embodiments of the present disclosure.

FIG. 5 provides some guidance for wiring these components together. Battery connection PI 172 provides a battery voltage and is attached to ground. Switch SI 174 toggles whether the battery voltage is sent to the rest of the system. Battery charger U3 178 is connected to the battery 12, and a voltage source and, when charging engages LED C2 180. LDO regulator U6 182 drops the battery voltage to 3.3V. Mini-B USB connection J1 184 is joined for data purposes to UART to USB circuit U1 188. UART to USB Circuit U1 188 receives data from Bluetooth uC/Module U4 190 which receives data from nine-axis motion monitor U7 192, serial flash memory U5 194 and GPS Module U2 198.

Figure 7:
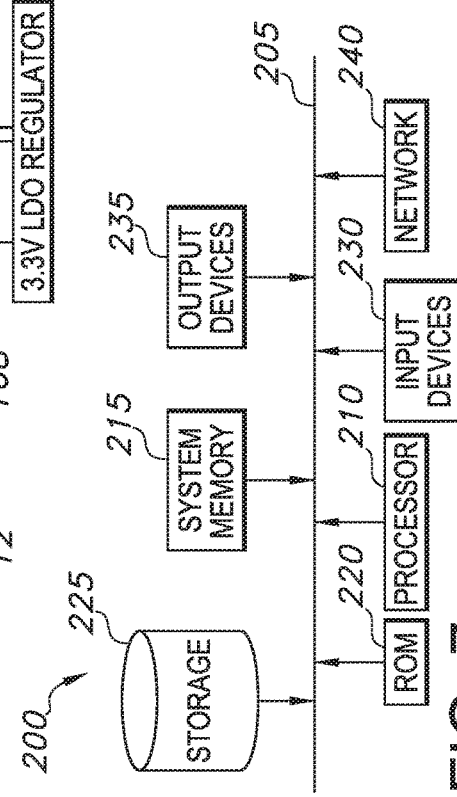

FIG. 7 conceptually illustrates an electronic system 200 with which some embodiments are implemented. The electronic system 200 may be a computer, phone, PDA, or any other sort of electronic device. Such an electronic system includes various types of computer readable media and interfaces for various other types of computer readable media. Electronic system 200 includes a bus 205, processing unit(s) 210, a system memory 215, a read-only 220, a permanent storage device 225, input devices 230, output devices 235, and a network 240.

FIGS. 8A-8D illustrate a schematic layout of the main components for a firearms monitoring system 800, including an inertial monitoring unit including gyro/accelerometer 802, GPS 804, force connector 808, power input 810, battery charger 812, laser 814, regulator 818, USB connector 820, flash memory 822, Bluetooth™ 824, programmable hardware 828, and the like.

Figure 8A:
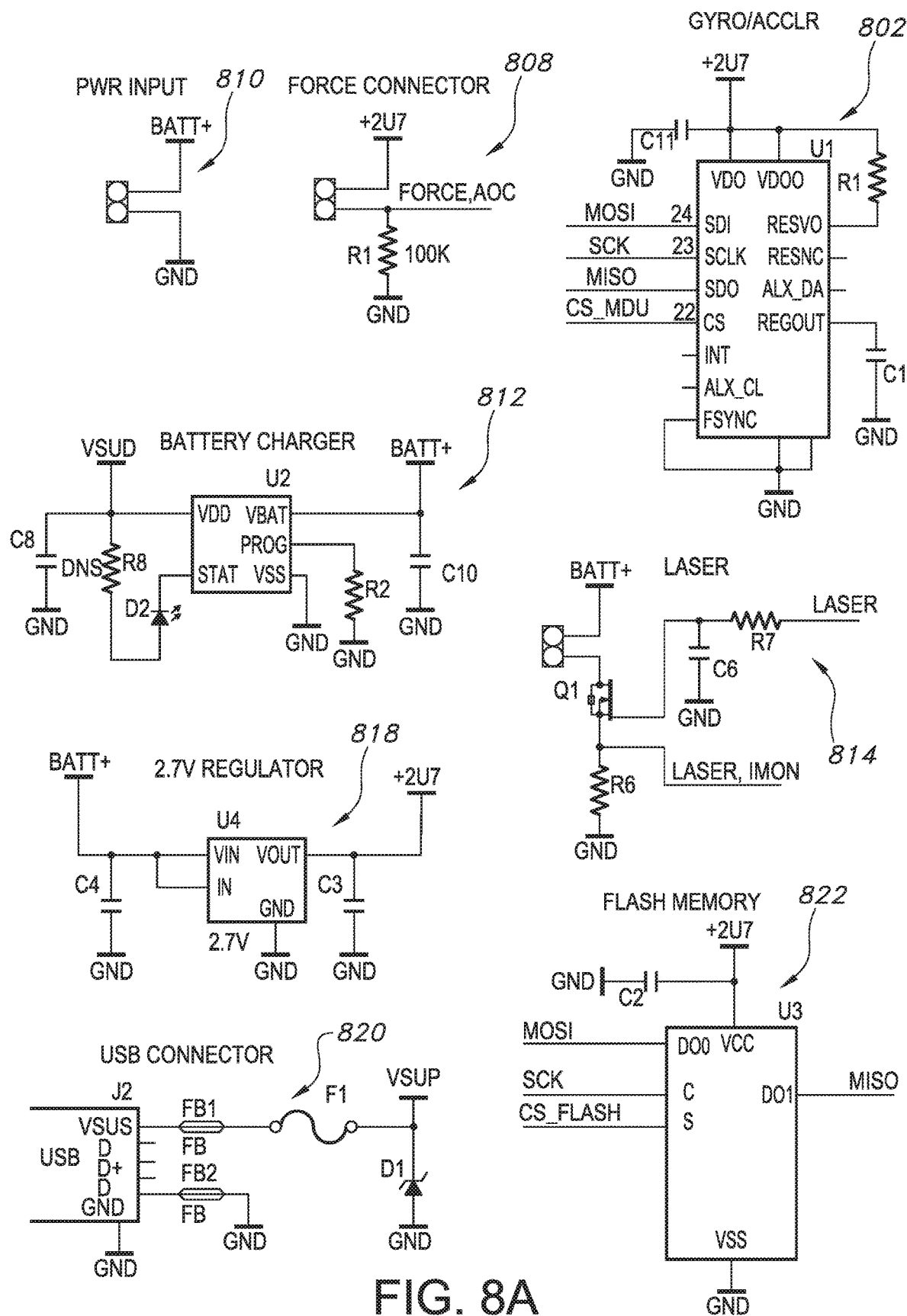
FIGS. 8A, 8B, 8C, and 8D are diagrammatic views of various system sub-components for the firearm usage monitoring system in accordance with embodiments of the present disclosure.
Figure 8B:
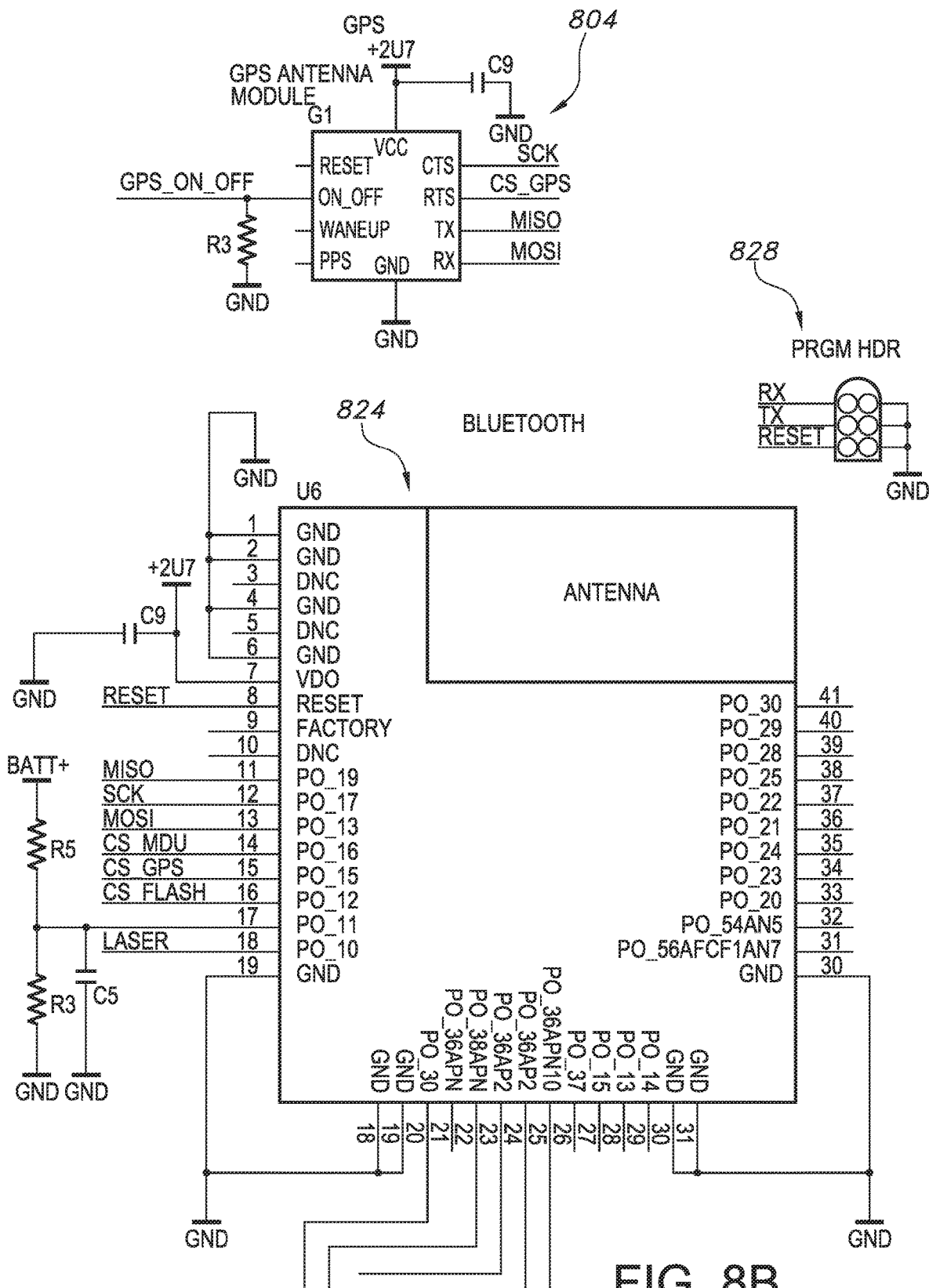
Figure 8C:
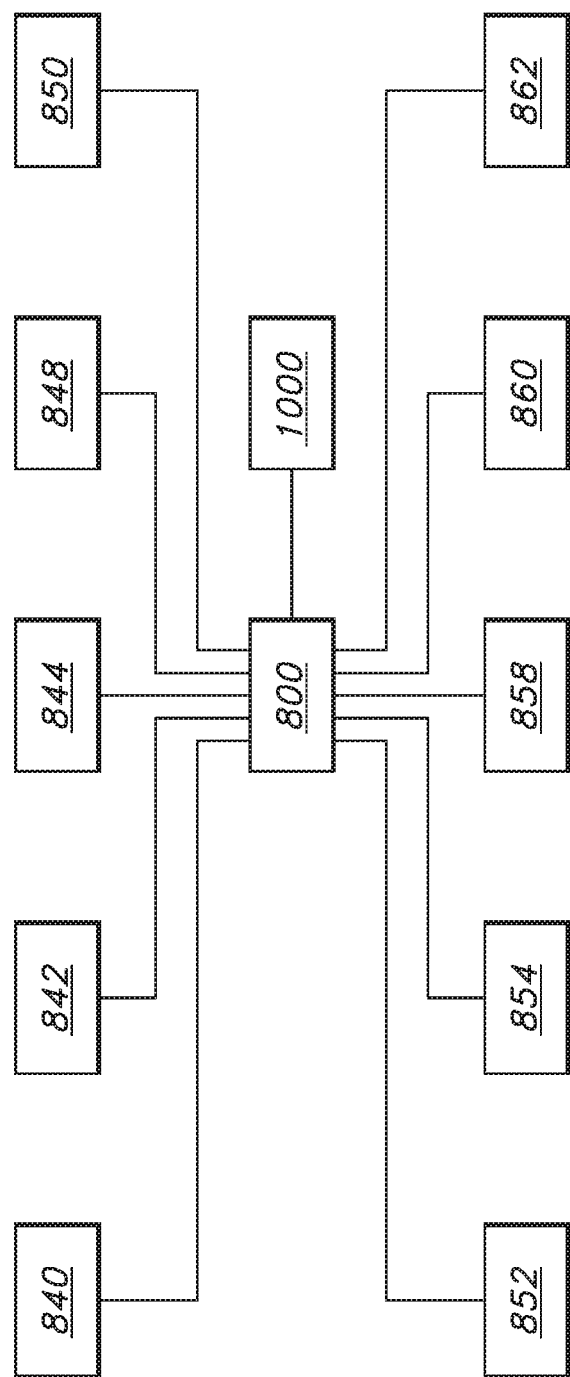
Figure 8D:
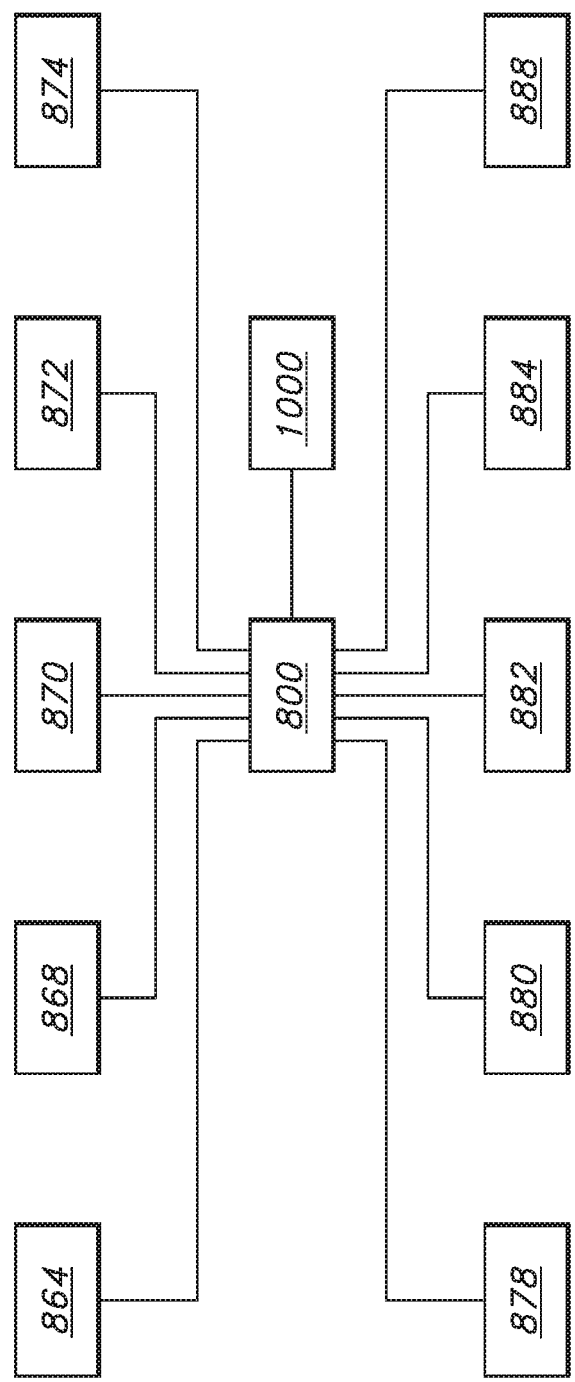
Figure 9:
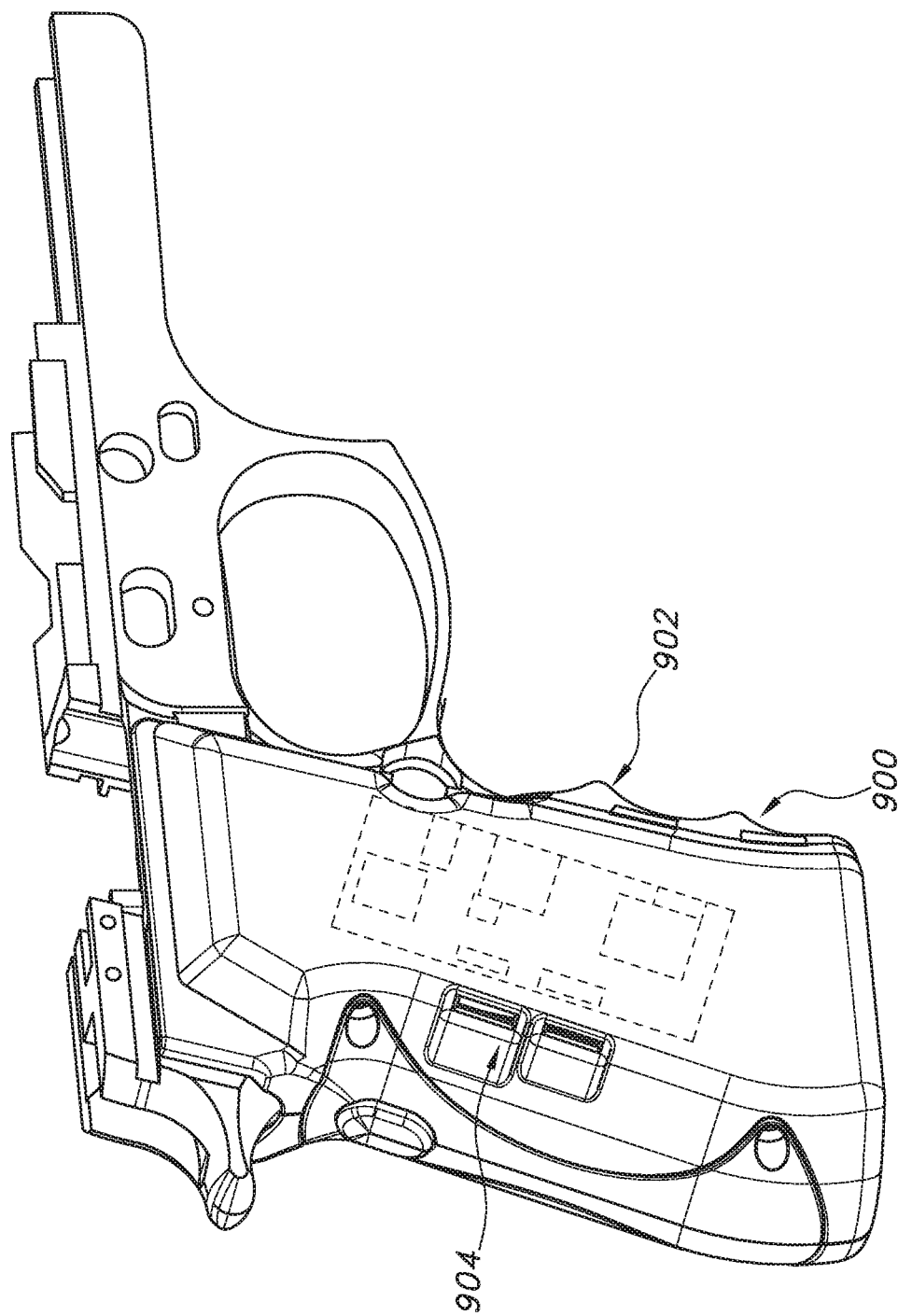
FIG. 9 is a partial perspective view of a firearm including the firearm usage monitoring system in accordance with embodiments of the present disclosure.

FIG. 9 illustrates a view of the firearm monitoring system 800 integrated into a grip 900 of a weapon 902. A circuit 908 board having one or combinations of the components illustrated in FIGS. 8A-8D is disposed within the grip 900 of the weapon 902 and is integrated so that it is almost invisible to the user, other than the presence of USB ports 904 that are covered by the hand of the user when the weapon is gripped.

With reference to FIG. 7, the bus 205 collectively represents all system, peripheral, and chipset buses that communicatively connect the numerous internal devices of the electronic system 200. For instance, the bus 205 communicatively connects the processing unit(s) 210 with the read-only 220, the system memory 215, and the permanent storage device 225. From these various memory units, the processing unit(s) 210 retrieves instructions to execute and data to process in order to execute the many processes disclosed herein. The processing unit(s) may be a single processor or a multi-core processor in different embodiments.

The read-only-memory (ROM) 220 stores static data and instructions that are needed by the processing unit(s) 210 and other modules of the electronic system 200. The permanent storage device 225, on the other hand, is a read-and-write memory device. This device is a nonvolatile memory unit that stores instructions and data even when the electronic system 200 is off. Some embodiments of the invention use a mass-storage device (such as a magnetic or optical disk and its corresponding disk drive) as the permanent storage device 225.

Other embodiments use a removable storage device (such as a floppy disk or a flash drive) as the permanent storage device 225. Like the permanent storage device 225, the system memory 215 is a read-and-write memory device. However, unlike the storage device 225, the system memory 215 is a volatile read-and-write memory, such as a random access memory. The system memory 215 stores some of the instructions and data that the processor needs at runtime. In some embodiments, processes are stored in the system memory 215, the permanent storage device 225, and/or the read-only 220. For example, the various memory units include instructions for processing appearance alterations of displayable characters in accordance with some embodiments. From these various memory units, the processing unit(s) 210 retrieves instructions to execute and data to process in order to execute the various processes of disclosed herein.

The bus 205 also connects to the input and output devices 230 and 235. The input devices 230 enable the person to communicate information and select commands to the electronic system 200. The input devices 230 include alphanumeric keyboards and pointing devices (also called "cursor control devices"). The output devices 235 display images generated by the electronic system 200. The output devices 235 include printers and display devices, such as cathode ray tubes (CRT) or liquid crystal displays (LCD). Some embodiments include devices such as a touchscreen that functions as both input and output devices.

Finally, as shown in FIG. 7, the bus 205 also couples the electronic system 200 to the network 240 through a network adapter (not shown). In this manner, the computer can be a part of a network of computers (such as a local area network ("LAN"), a wide area network ("WAN"), or an intranet), or a network of networks (such as the Internet). Any or all components of the electronic system 200 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

With reference to FIGS. 6 and 8B, the hardware and software, in embodiments, can be activated using one or more of any form of user feed sensor 840, force sensor 842, wireless remote 844, remote on/off switch 848, and the like. Moreover, the hardware and software can be activated using one or more mobile device 850, user wearables 852, dedicated hardware token 854 making a wireless or wired connection, or the like. In embodiments, the firearm usage monitoring system 800 may operate with the following instructions: receiving a signal from a force sensor 842 such as the force sensor 120 (FIG. 6). If the signal is present, then the firearm usage monitoring system 800 engages, else the system 800 remains in a dormant or sleep mode with low voltage draw as noted above. If the signal of the force sensor 842 is on, then the Bluetooth UC/Module 130 receives a signal from the GPS module 160 as to where the system 800 is presently located. As noted above, one or more signals other than from the force sensor 120, 842 can activate the system 800. Once the system 800 is active, the inertial monitoring unit 802 (FIG. 8A) can provide information as to how the firearm 20 is oriented and moved in 3D space until pressure releases on the grip 24. The system 800 can determine the firearm 20 has been motionless for a preselected period, or the information is specifically queried. Information as to how the firearm 20 is oriented and moved in 3D space can include analyzing the firearm 20 for recoil and/or shot count when fired to discern orientation, direction, and position at the time of discharge. This data can be stored in the flash memory 150. The flash memory 150 can be transmitted through the Bluetooth uC/Module 130 to another Bluetooth compatible device. The information including orientation, direction, and position can be also transmitted from the firearm 20 at preselected time intervals, specific times, distances from certain locations (e.g., geo-fencing capabilities), at the time of discharge, at the time of reload of rounds 30, when the safety 34 (FIG. 2) is removed, and the like.

In embodiments, the firearm usage monitoring system 800 may record the motion of the firearm 20 and provide geolocation information 858, which may be coordinated with other information, such as disclosed herein.

In embodiments, the system 800 may transmit data via the network connection 240 (FIG. 7), such as a cellular network, to a remote server, which may be a secure server, or other remote processing components, such as the mobile device 850, cloud platform 860, or the like. In embodiments, the system 800 may include an efficient architecture and components for low power consumption, including energy harvesting mechanisms 862, such as harvesting the energy of motion of the firearm or energy from the recoil to provide power for storage and/or reporting of data. In embodiments, methods and systems provide rapid, efficient determination of location. The energy harvesting mechanisms 862 may also be configured to harvest local energy in the radio frequency (RF) domain or other appropriate local electromagnetic signals of sufficient strength.

In embodiments, the network connection 240 (FIG. 7) by which the system may communicate data may be a mesh network connection 864. With reference to FIGS. 8C and 8D, the mesh network connection 864 may be a connection to one or more other firearms or one or more other devices, such as a mobile robot 868, an infrastructure device 870, or the like. The mesh networking connection 864 may form part of a large mesh network, allowing devices, such as firearms and mobile robots, to communicate directly with one another, rather than having to first connect through a centralized network communication hub, or as a supplement to communication by one or more devices to such a hub. Such devices may include self-disposing devices 872, for example, self-disposing mobile robots.

In embodiments, the mesh network 864 may be a self-organizing and fluid mesh network that organizes and reorganizes itself based on specified data, including data filtered or weighted based on specified criteria, and/or the dynamic detection of other devices, for example with a geographic perimeter. Other devices may include deployable mesh network hubs 872, also known as "pucks", beacons, wireless access points, such as Wi-Fi access points, lighting systems, cameras, and the like. The mesh network 864 may also include asset management systems, crowdsourced communications, frequency scanning networking, cellular mesh networking or other systems.

In embodiments, devices on the mesh network 864 may adjust location information based on the relative movement of each other within the mesh network 864. In embodiments, the relative movement of devices may be reported by other devices within the mesh network 864 over the mesh network 864, such as to the self-disposing devices 872. The relative movement of other devices may also be derived from inertial measurement units (IMUs) disposed with the other devices within the mesh network 864.

Relative movement information may include speed, velocity, acceleration or position information, and/or event identification information 874. Such information may include threat identification information, shot accuracy information and the like. Event identification information may include weapon information, information indicating a person is in an unauthorized area, soldier maneuver information (e.g., speed, direction, activity, or the like), in-position information (such as for an individual or a device), rate-of-fire information, alternating fire information, maintenance required information, stoppage event information, ammunition expenditure information, fight or struggle information and the like. In embodiments, authentication information may be received from radio frequency identification (RFID) implants, for example, implanted in the person.

In embodiments, the relative movement, such as among devices in the mesh network 864 like firearms 20 and other equipment may be provided relative to at least one geographic location, such as through the use of data from the inertial measurement units (IMUs) or from one or more other data sources. In embodiments, location may relate to relative locations of one or more other firearms or other devices connected to the mesh network 864, such as the distance, direction, and/or movement of one or more other firearms 20 or other devices relative to a given one. In such embodiments, geographic location and movement information 858, whether relating to a location or to another firearm or other device may be communicated to a given firearm or other systems of an individual handling a firearm over the mesh network 864. In embodiments, the geographic location may be an underground geographic location, where other geographic location detecting signals, such as GPS are not available. In embodiments, a combination of geographic location and relative location may be understood by the system, such as where at least one member of a mesh network has a detectable location (such as by GPS signal) and other members have locations that are determined relative to the known member, such as by detecting motion through the inertial measuring unit (IMU) 802 or other non-GPS systems. It may be appreciated from these embodiments that using data from the IMU 802 on the mesh network 864 may allow the firearm usage monitoring system 800 to provide discharge location information in geographic locations that may not otherwise be covered by geographic location detecting signals.

In embodiments, the mesh network 864 connection may be a wireless mesh network connection and may be configured based on radio communication frequencies. In some situations, radio communication frequencies may be subject to interference or jamming, either intentionally or otherwise, making communication difficult or impossible when attempting to establish a connection over the compromised frequency. Interference or jamming may include radio frequency interference or jamming, optical jamming, noise, and the like. Because of the risk of jamming, and because communication reliability may be critical for user of the firearm usage monitoring system 800, the firearm usage monitoring system 800 may detect such jamming of one or more frequencies and automatically adjust the frequency of the mesh network 864 to avoid using the compromised frequency, such as by selecting a frequency not currently subject to interference or jamming. The firearm usage monitoring system 800 may then establish a wireless mesh network connection with another device using the selected frequency. Jamming or interference detection may include detecting attempted signal interception and scrambling transmitted information to avoid the detected signal interception.

In embodiments, the firearm usage monitoring system 800 may determine discharge information 878 related to the firing of the firearm 20 connected to the mesh network 864. The discharge information 878 may include discharge location, direction of the discharge, a motion path of the firearm preceding discharge and/or orientation of the firearm at discharge. Orientation information 880 may be provided by the IMU 802 and may include enemy area location and size information, unsafe act information, line of fire information, shift fire information, sectors of fire information, interlocking fire information, 360 perimeter security information and the like.

The discharge information 878 may be determined from motion and location information, such as provided by devices connected to the mesh network. For example, the discharge location may be determined from geographic location data of one or more firearms connected to the mesh network 864 and may use relative movement data provided by the other devices connected to the mesh network 864, for example by analyzing relative movement data that is based on resident IMU data from other firearms connected to the mesh network 864.

In embodiments, methods, systems and components are provided for a small-footprint firearms tracking system 882, such as one of the dimensions less than 25 mm×25 mm×4.55 mm). In embodiments, the firearm tracking system 882 may identify movements and actions while in sleep mode, such as to trigger transmission of alert codes. In embodiments, the firearm tracking system 882 may be adapted for integration with various gun platforms, such as to interface with different grips, handles, and other internal and external firearm components and accessories, including being integrated entirely into the grip of the firearm.

In embodiments, the system may use over-the-air updates, may act as or integrate with a beacon 884 (such as a BLE Beacon), may be charged by wireless charging, and may record data (such as inertial measurement unit (IMU) data) when in active or inactive mode (such as to flash memory) and may enable a sleep/hibernation mode.

In embodiments, components are provided for a small-footprint firearms tracking system 882 may include Simblee (Bluetooth Low Energy, Microcontroller Unit), Micron N25Q256A13EF840E (256 Mbit Flash Memory), MPU9250 (9 axis accelerometer, gyroscope, and magnetometer IMU), ORG1411-PM04 (Origin GPS Nano Hornet, 2.7V), FSR-400 (Force Sensor), 800 mAh LiPo Battery, Battery Charger (MCP73831), 2.7 V Regulator (MIC5365), 3 V Laser, and/or UB-MC5BR3 (Waterproof USB connector).

In embodiments, the system may function in active modes, sleep modes and/or hibernation modes. In active mode, the device may be in full power mode, such as using power for collecting readings from the IMU and GPS and transmitting them via a local protocol like BLE to an edge device. The laser module 814 may also be activated. In embodiments, data can be sent in this format at relatively high data rates, such as at 30 messages/second, 50 messages/second, 100 messages/second, or the like. A sample string may include AB-FC-22-CC-B3-00-00-00-00-00-00-00-00-00-00-00-00-5E-89-5A-C0-71-3E-E6-C0-FA-18-9C-C0-00-20-75-3F-00-80-52-3E-00-00-19-3E-00-00-B4-40-67-66-00-C1-34-33-6B-C0-01-B A. The guide may be as follows: AB (header), FC-22-CC-B3-00 (millisecond timestamp), 00-00-00-00 (latitude), 00-00-00-00 (longitude), 00-00 (altitude in meters), 00 (horizontal accuracy in meters), 5E-89-5A-C0 (gyro x), 71-3E-E6-C0 (gyro y), FA-18-9C-C0 (gyro z), 00-20-75-3F (accel x), 00-80-52-3E (accel y), 00-00-19-3E (accel z), 00-00-B4-40 (mag x), 67-66-00-C1 (mag y), 34-33-6B-C0 (mag z), 01 (unit status), BA (footer). A millisecond timestamp may be used, such as in a modified Unix timestamp, e.g., for milliseconds after 01-01-16. If BLE is unavailable or a message is not sent, this may be stored in the flash memory 150, 822 to be sent when the device enters sleep mode. Active mode may be triggered when force is applied to the force sensor 120, 822. Depending on configuration, the system 800 may remain in active mode for a specified time, such as two minutes after the force is no longer applied, for five minutes, for ten minutes, or the like. This timer may be reset when force is reapplied. In embodiments, the laser module 814 may be turned on at limited times, such as when the force applied to the force sensor (optionally based on the mode or regardless of the mode). This mode may consume, for example, around 70 mAh of energy.

The unit may also power down into a "sleep" mode, such as when there is no longer force applied to the unit and the timer has gone down (indicating expiration of active mode). In such a sleep mode, one message may be sent at a defined period, such as once per second, such as containing the timestamp, location data, and current orientation data 880. The GPS module 160,804 may enter an ATP (adaptive trickle power) state where it cycles between full power and ATP to minimize power consumption while maintaining a fix on its location. In embodiments, a location fix may be maintained consistently, regardless of power mode. In embodiments, the IMU may be polled at a low rate, such as to monitor movement. If no movement is sensed for a given time, such as five minutes, then the unit may go into another even lower power mode, referred to herein as a hibernation mode.

In such as hibernation mode, the unit may continue to send messages (e.g., one per second), such as containing the timestamp, location data, and current orientation data. The GPS module 160, 804 may enter hibernation where it consumes, for example, under ImA of power. The IMU 802 may still be polled at a low rate. If movement exceeds a certain threshold, the unit may go into sleep mode and the GPS module 160, 804 may wake up to maintain a location fix. This mode may consume, for example, under 7 mAh.

In embodiments, the firearm usage tracking system 800 may communicate with external systems, such as by delivering reports, events, location information, and the like. In one such embodiment, a signal may be provided to a camera system 880, such as a body camera worn by an individual, to initiate recording by the camera, such as recording video of a scene involving the individual. For example, the camera system 888 may initiate recording upon receiving a signal indicating that a weapon has been raised into an aiming position so that the situation in which that activity occurred is recorded. By triggering the camera system 888 to activate one or more body cameras upon such events, use of the body cameras may be limited to key situations, potentially reducing the storage and data transmissions requirements for capturing, storing and transmitting video data over networks, which can be very expensive if large amounts of video are captured for normal daily activities for which there is little use for recorded video. Thus, the firearm usage monitoring system 800 may enable a much more efficient overall monitoring system, including one that records video involving the user of the firearm 20.

In embodiments, data, such as various firearm usage events (such as gripping the firearm, raising the firearm, discharging the firearm, moving around with the firearm, entering defined locations with the firearm, and the like) may be stored, analyzed, and provided, either in raw form or in various packaged feeds, such as analytic feeds, to external systems. With reference to FIG. 10B, one class of system that may consume such data and/or analytics is an insurance system 1050, where such data may be used for various purposes, such as for underwriting and pricing insurance contracts (such as for liability insurance, accident and hazard insurance, health insurance, life insurance, and others) involving one or more individuals or groups for whom firearm-related activity is monitored by the methods and systems disclosed herein. This data may be used for actuarial purposes (such as to predict the likelihood of adverse events involving firearms, such as accidents or other problems), as well as to compare the relative safety of a given group as compared to one or more cohorts. For example, a security firm that wishes to obtain liability insurance can be compared to other security firms in the same industry or area, and the extent to which weapons are gripped, raised, or discharged can be considered in determining whether to issue insurance and at what price insurance should be issued. This may include data related to on-the-job events as well as data related to training (such as where consistent usage in training situations may serve as a favorable indicator for underwriting).

In embodiments, the firearm usage tracking system may include a technology stack that includes hardware elements, software elements, and data.

Methods and systems are provided herein for identifying discharges and counting shots, discharges, etc. Conventional technologies for doing so typically require a spring in the magazine and a system for detecting where the spring is positioned. For example, as another bullet went into the chamber of the weapon, the spring position helped measure rounds in a magazine. By contrast, the present disclosure provides an external device that can be attached to the firearm 20 to register when a shot is fired. The discharge has a unique, detectable, physical profile (i.e., a discharge has recoil that has a particular motion profile, sound profile, and the like). A recoil measuring system 1052 may use an Inertial Monitoring Unit (IMU), including or combined with motion-detecting/sensing elements, including one or more accelerometers, gyros, magnetometers, and the like. In embodiments, a map is developed based on analysis of discharge events to the map 1054 the entire motion sequence caused by a typical discharge. That motion profile, which may be unique to each weapon platform and user, can be stored and used as a basis for comparing future sensed data to determine whether a discharge event has occurred. Similar profiling can be used for each weapon type to determine whether the firearm has been raised to an aiming position or out of the holster position.

In embodiments, a firearm usage monitoring system 800 may allow a user to validate a threat, for example in a combat situation. A firearm usage monitoring system 800 may establish a pressure signature 1054 to validate the threat. The threat may be validated by the firearm usage monitoring system 800 by comparing the pressure signature against a range of pressure signatures, for example from no pressure to extreme pressure.

The pressure signature 1054 may be established by collecting information, such as information from sensors, such as a sensor equipped firearm and the like. In embodiments, sensors may be wearable sensors 1058, such as from an armband, a watch, a wrist band, glasses, a helmet or other headgear, an earpiece, or the like, or may be combined with other sensors, including multi-modal sensors 1060. Sensors may also include other wearable sensors, firearm motion sensors, firearm orientation sensors, firearm discharge sensors and combinations of sensors. Combinations of sensors may include combinations of wearable and firearm sensors, combinations of firearm and fixed sensors, for example, Internet of Things (IoT) sensors, and the like. A sensor equipped firearm may include a pressure sensor, for example to determine a grip profile using information such as threat ID, shot accuracy, engagement, alert information and tactical information. Information collected from a sensor equipped firearm may include discharge information, motion information, rate of motion information, orientation information and the like.

The rate of motion information may include movement information related to speed, threat identification and shot accuracy. Movement information may also be related to an event identifier for events, such as events associated with weapons and people. Events associated with firearms may include events indicating the firearm has fallen, is outside of a pre-designated distance from its owner, in an unauthorized area and the like. Events associated with people may include events indicating a person is in an unauthorized area, the maneuvering speed of the person and the like.

Determining the pressure signature 1054 may also include determining a firearm-specific candidate action of a first firearm user, from at least a portion of the collected information. The candidate action may be compared with other firearm users, for example, other firearm users proximal to the first firearm user or other firearm users associated with the first firearm user.

The collected information, candidate action or actions, and action comparison result may then be stored in a data structure that represents the pressure signature 1054. The collected information, candidate action or actions, and action comparison result may also be filtered or weighted based on specified criteria, prior to being stored in the data structure that represents the pressure signature 1054.

In embodiments, the firearm usage tracking system 800 provides alternatives for monitoring discharges, such as cameras, or augments those other monitoring systems. The methods and systems disclosed herein may include image recognition, which can identify the flash of a muzzle or for the slide rocking back. The system may also have acoustic abilities and may provide sound recognition.

In embodiments, the firearm usage tracking system 800 includes an infrared gate in front of the ejection port. This gate 1062 can track a disconnect when the weapon is fired, such as when the shell is engaged and breaks the gate 1062. In embodiments, the firearm usage tracking system 800 may include a hall effect sensor 1064 to measure the motion of an internal part. In embodiments the firearm usage tracking system 800 can capture the discharge profile of a given weapon by using an inertial measurement unit (IMU). The discharge profile may have unique inertial characteristics when a weapon is discharged, such as based on the geometry, distribution of weight, specified ammunition, and the like, so that a discharge can be profiled and identified based on a series of movements that are measured by the IMU. In embodiments, the firearm usage tracking system 800 may track with a global positioning system (GPS). In embodiments, the firearm usage tracking system 800 includes network reporting facility, such as through a Bluetooth discharge report to a centralized server. In embodiments, the firearm usage tracking system 800 can also measure when a hand is on the grip of the weapon indicating a threatening situation. This sensor, button, or switch can provide valuable data, such as by alerting others to a potentially dangerous situation.

In embodiments, the firearm usage tracking system 800 includes an activity monitor which will indicate events such as when the gun is elevated and being pointed.

In embodiments, the firearm usage tracking system 800 includes a slim profile, waterproof enclosure to house the electronics and housing. In embodiments, the firearm usage tracking system 800 includes a grip-integrated reporting device including GPS technology. In embodiments, the firearm usage tracking system 800 can be customized with various grip configurations and textures, such as to fit any kind of weapon with a familiar, comfortable type of grip that is typical for that weapon.

In embodiments, the system 800 can be integrated with other systems and accessories. For example, a visible light (such as green or red) or infrared laser pointing module 814 can be integrated with the grip, such as to help with target acquisition, a flashlight to improve visibility, or a range finder also for target acquisition.

In embodiments, the firearm usage tracking system 800 contains a wireless charging system for the firearm discharge device. This allows greater ease of use.

In embodiments, the firearm usage tracking system 800 allows for manual or automatic calibration of the laser designator. In embodiments, the firearm usage tracking system 800 can detect alternative tracking systems when in a denied GPS location; for example, the system can triangulate with cellular to provide an initial location to increase the speed recognition of location or the system can triangulate with Wi-Fi or other beacon technologies. In embodiments, the firearm usage tracking system 800 augments GPS with IMU to maintain relative position over time. The system can then provide better accuracy on physical location within a building that cannot support GPS tracking. In embodiments, the firearm usage tracking system 800 integrates with GPS-denied navigation systems.

In embodiments, the firearm usage tracking system 800 augments the physical location detection with depth sensors and camera systems to gather data.

In embodiments, the firearm usage tracking system 800 provides data storage. The system gathers data when the device is gripped through minutes after the device is disengaged. If the device cannot transmit to the edge device on the network (e.g., not available, out of range), it may store (e.g., for up to 30 days) in onboard memory (e.g., through high data rate memory). Once available, the system may restart the transmission process, so that the data is sent over.

In embodiments, the firearm usage tracking system 800 has an ecosystem for data. In embodiments data may be aggregated, such as to create an aggregate database for firearms data, with various metrics that can be applied to that kind of data, such as indicating groups or locations that use weapons with varying frequency, that undertake more or less training, and many others.

In embodiments, the firearm usage tracking system 800 provides power management capabilities. If the device is in motion but not in use, the low power mode (e.g., with occasional pinging) may be implemented to maintain general awareness of the location of the user. The device transmits a location every one second. If not used for a period of time, (e.g., for ½ hour) the device may send one message at a defined interval, such as every second, every minute, every one-half hour, every hour, or at other intervals.

In embodiments, the firearm usage tracking system 800 provides inventory control. With monitoring, an alert can be sent and the weapon can be tracked. Thus, for a manager, the system may provide locations of all weapons of a given force at any given time.

In embodiments, the firearm usage tracking system 800 provides firearm maintenance. With monitoring, the system may provide data on the number of rounds discharged and which gun components need maintenance or replacement.

In embodiments, the firearm usage tracking system 800 provides real-time tracking of users when in motion. This can identify where the device and users are at any time and when the weapon is in motion.

In embodiments, the firearm usage tracking system 800 integrates with the body camera systems 888 and automatically activates when the device is gripped or in motion. The body camera data can then be streamed in real-time when in use.

In embodiments, the firearm usage tracking system 800 can be activated when motion is detected from the body camera system 888.

In embodiments, the firearm usage tracking system 800 integrates with wearable devices 1058, such as activity monitors. It can integrate with mobile devices and the Emergency Response Data communications architecture.

In embodiments, the firearm usage tracking system 800 includes geofence-based alerts. The geofence capability can be implemented around a warehouse where weapons are stored to track weapons for inventory control or threatening situations.

In embodiments, the firearm usage tracking system 800 can include personnel information including home addresses for location-based reaction.

In embodiments, the firearm usage tracking system 800 includes a dashboard user interface 1068. A map is populated with icons showing exact locations of weapons. The icon can include all personnel information for the weapon, status, and includes a button to zoom in on that location (and drill down on the data). In embodiments, the firearm usage tracking system 800 provides aggregating units in the dashboard user interface 1068. When the map becomes too dense with overlapping icons, the map may adjust to include a new icon symbolizing multiple units within the specific area.

In embodiments, the firearm usage tracking system 800 provides software-aided dispatch integration. The software used for monitoring firearms can replace or augment the current computer-aided dispatch system to gain efficiency in call response and have one program to be more effective.

In embodiments, the firearm usage tracking system 800 integrates with Police Evidence Collection Systems, such as providing a centralized software suite that gathers the evidence information (and allows certain users to view and upload the information, creating efficiencies across departments).

In embodiments, the firearm usage tracking system 800 allows individuals to review and replay firearm data as part of evidence collection, training, and/or auditing purposes.

In embodiments, the firearm usage tracking system 800 integrates with shooting ranges and retail point of sale (POS) inventory and maintenance systems 1070.

In embodiments, the firearm usage tracking system 800 integrates with the flight deck of an airplane. The system may provide an IMU in the plane's steering wheel for further tracking purposes.

In embodiments, the firearm usage tracking system 800 integrates with the controls of cargo ships, and the like. The system may provide an IMU in the ship's steering wheel for further tracking purposes. In embodiments, the system may provide tracking within shipping containers.

In embodiments, the firearm usage tracking system 800 integrates with various vehicles and inventory to provide fleet and/or inventory management.

In embodiments, the firearm usage tracking system 800 can adapt for a large variety of firearms with various grip options.

In embodiments, the firearm usage tracking system 800 provides over the air (OTA) updates for software upgrades.

In embodiments, the firearm usage tracking system 800 can integrate with original equipment manufacturer (OEM) components such as IMU, GPS, and Bluetooth.

In embodiments, the firearm usage tracking system 800 provide, integrate with, or connect to the machine control system 1000 and machine-learning systems 1072 including custom algorithms for determining recoil of the firearm and other behaviors or characteristics of the system. For example, in embodiments, the firearm usage tracking system 800 includes machine learning systems 1072 with identification algorithms to determine the complex motion associated with the discharge of a particular type of weapon. Embodiments may include feeding IMU data collected upon gripping, movement, and discharge of weapons into the machine learning system 1072, so that the system can learn the parameters of each with respect to enough training events that it can rapidly and accurately identify new events based on new IMU data, such as collected in real time. In embodiments, the system 1072 can be trained to learn to identify a threatening situation when the grip is engaged and the firearm is pointed, when the motion has increased indicating a pursuit, and when it is not in motion (e.g., placed in sleep mode). More complex patterns can be learned, such as determining what patterns tend to lead to accidents, dangerous incidents, higher quality training, and the like.

In an example of learning and utilization of a complex pattern, a firearm usage monitoring system 800 may use the machine learning system 1072 to determine firearm movements that may indicate a discharge from the firearm is imminent. In this example, the machine learning system 1072 may, for example, detect motion and orientation data from sensors, such as from sensors on the firearm 20, sensors in the mesh network 864 (including other firearms) or wearable sensors (e.g., multi-modal sensors) of the human user of the firearm, which in turn may be used by the machine learning system 1072 to facilitate a threat response. In embodiments, a threat response may include an automatic threat response, such as by one or more machines that are teamed with the human user of the firearm 20.

In embodiments, the machine learning system 1072 may determine combinations of data, such as motion, orientation and multi-modal sensor data that are indicative of imminent discharge of the firearm.

The machine learning system 1072 may also receive other inputs or generate information to combine with the sensor data, such as an indication of a firearm state. Firearm states may include combat states, training states, wartime states, peacetime states, civilian states, military states, first responder states, incident response states, emergency states, on-call states, and the like. Firearm states may be states from one or more than one firearm, for example, a set of firearms associated with a group of soldiers in the same section of a battlefield or a set of police officers in a region.

Combinations of data may allow the machine learning system to recognize, determine, classify, or predict information, such as about environments, objects, image content, whether a person is friendly or adversary, structures, landscapes, human and human gestures, facial indicators, voices, and locations, among others. Example combinations may include combinations of data from topography and physiological monitors, ISR, and structure recognition combinations, as well as combinations of human and machine physical states. Combinations of data may also be tactical combinations. Tactical combinations may combine data from devices on a battlefield, information about other sectors of fire, and the like and may include firearms and other weapons, vehicles, body armor and other wearable elements, and the like (collectively referred to herein as "battlefield of things") devices including, for example, remotely operated units such as Common Remotely Operated Weapon Stations (CROWS) or other remote controlled firearms that may be configured with heavier calibers and higher lethality.

Objects that may be recognized by machine learning may include weapons, man-made objects, natural objects, and the like. Structures may include doors, stairs, walls, drop-offs, and the like. Human gestures may be detected, interpreted and understood by the machine learning system, while facial indicators could be indicators of mood, intent, and the like. The machine learning system 1072 may use thresholds to assist with determination and recognition process. For example, combinations of data exceeding specified levels may provide a high degree of confidence that the recognition process is accurate.

In embodiments the machine learning system 1072 teamed with the human user of the firearm 20 may be operated autonomously, for example in response to a determined intent of the human user of the firearm 20 teamed with the machine learning system 1072. The firearm usage monitoring system 800 may detect gestures of the human firearm user, such as by capturing and analyzing data from sensors that detect conditions of the human, as well as firearm sensors. Sensors that detect conditions of the human may include multi-modal sensors and multi-modal wearable sensors. Gestures may include pointing gestures, threat identification gestures, target acquisition gestures, signaling gestures and the like.

In embodiments, conditions recognized by the machine learning systems 1072 or sensed in order to facilitate training of the machine learning system 1072 may include conditions indicative of human states, such as stress and other physiological states. Conditions indicative of human states 1074 and captured by sensors for analysis by the firearm usage monitoring system may include heart rate conditions, for example, physical state relationships, blood pressure conditions, body temperature, galvanic skin response, heat flux, moisture, chemistry (for example glucose levels), muscle states and neurological states. Various biological conditions or biosensors may be indicative of threats, such as heart rate conditions, body temperature, moisture (such as indicating excessive perspiration), blood pressure, galvanic skin response, and others. Firearm sensors may be multi-modal firearm sensors and may include sensors that detect motion, orientation and discharge state of the firearm 20.

Analyzing the data by the firearm usage monitoring system 800 may produce a set of candidate intents 1080 of the human firearm user or of another individual in proximity to the firearm user (such as where camera information, voice information, and the like is available). The candidate intents 1080 may, in embodiments, be combined with physical and operation machine state information to select one or more action plans 1082. The machine teamed with the human user of the firearm 20 may then execute and adjust the selected action plan 1082 based on updated intents, machine states, and environmental factors. Machine state factors may include physical factors, operational factors, orientation factors, tactile/force factors, and the like.

Environmental factors 1084 may include weather factors, location data factors, altitude factors, topography factors, video factors and the like. Weather factors may include temperature, humidity, wind speed, wind direction and precipitation factors, among others. Location data factors may include streaming data, as well as data acquired from global positioning systems (GPS) and beacons, access points or the like, as well as through cellular tri angulation. Topography factors may include data and observations, while video factors may include both live and archived video feeds. The action plan 1082 may also be formed from a set of predetermined action steps, for example, action steps that each satisfy human teaming criteria selected to coordinate with at least one of the candidate intents 1080. Actions steps may also be arranged into action plans by sets of rules.

Figure 10A:
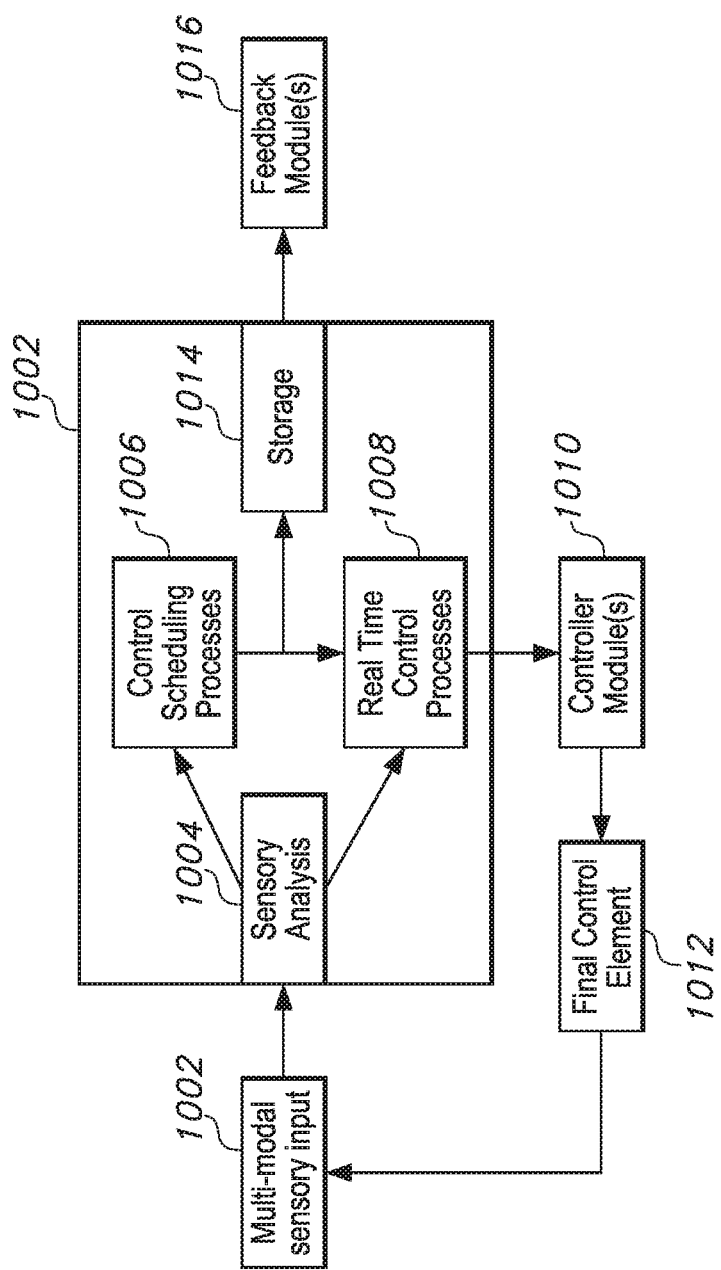
FIG. 10A is a process view of a machine control system of the firearm usage monitoring system in accordance with embodiments of the present disclosure.
Figure 10B:
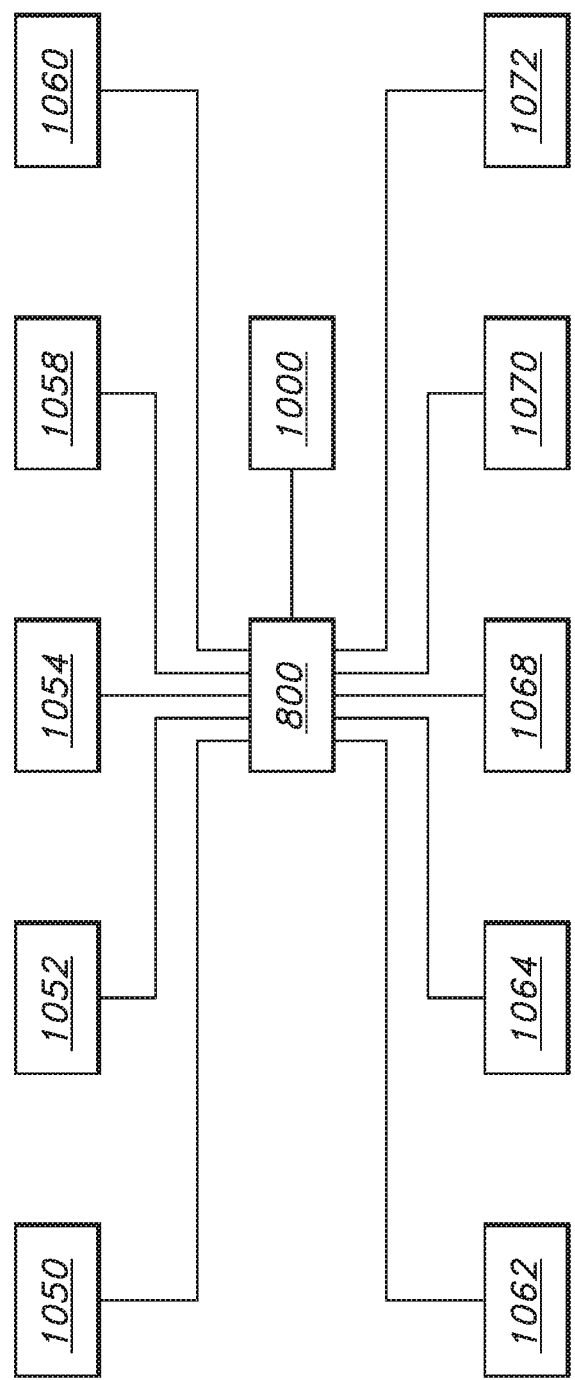
FIGS. 10B and 10C are diagrammatic views of various system sub-components for the firearm usage monitoring system in accordance with embodiments of the present disclosure.

With reference to FIG. 10A, the machine learning system 1072 may include the machine control system 1000 that may team with a human user of a firearm. The machine control system 1000 may receive multi-modal sensory input 1002 from multi-modal sensors. The multi-modal sensory input 1002 may send sensed data to a sensory analysis module 1004. The sensory analysis module 1004 may forward an actionable representation of the sensed data to a control scheduling process module 1006 and a real-time control process module 1008 for further processing.

Figure 10C:
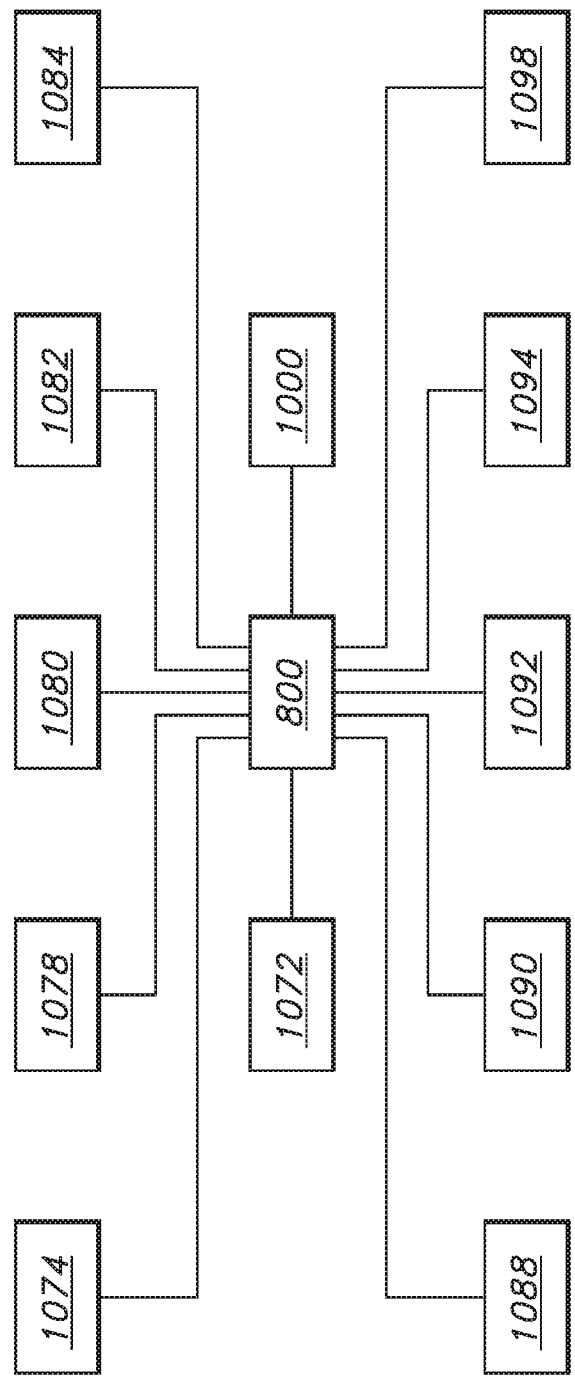

The control scheduling process module 1006 may provide scheduling control information to the real-time control process module 1008 that may issue machine control scenarios to machine controller modules 1010. The machine control modules 1010 may affect the machine control scenarios, for example by mechanization of the machine through a final control element module 1012. Machine control scenarios may include recognition of celebratory situations such as dancing scenarios and fist bump scenarios separate from other human machine learning scenarios in much more threatening and complex environments. In many examples, the machine learning system 1072 may identify celebratory fire over threatening fire. In embodiments, one or more analysis-schedule-real-time modules 1088 (FIG. 10C) may store information in a storage module 1014 for use as feedback/input to the machine learning system, such as feedback provided through feedback modules 1016, that then may adjust parameters for teaming. It will be appreciated in light of the disclosure that it may not be practical to hard code every combination of movement and therefore the machine learning system 1072 may be configured to identify one or more series of movements after being shown by one or more human users of other machine learning systems. By way of these examples, the machine learning system 1072 may learn the movements of the its users by translating and detecting their motion and comparing the identified motions in context with the environment in comparison with trained examples, confidence in those examples, corrections to past activity, and the like to assist, anticipate, protect, support, and facilitate the needs of the users in the theater more quickly and more safely.

In many examples, social interactions between human users and machines deployed with them must be learned by both parties. It will be appreciated that early stage robots (i.e., those incapable of expressing "feelings") could improve the psyche of their human counterpart even with little mutual social interaction. With that said, many situations arise where mutually beneficial social interactions between the users and the machine learning system 1072 may improve the ability of the machine learning system 1072 to assist, anticipate, protect, support, and facilitate the needs of the users in the theater more quickly and more safely. Many situations are additionally good candidates to train the machine learning system 1072 to understand friendly environments over threatening situations. In these environments and situations, the machine learning system 1072 may need to learn how to interact more with human users in order to better produce a more intuitive experience. In much the same way as our homes may be associated with a certain smell or feeling, the machine learning system 1072 may need to understand and relate sensory inputs with other inputs and schedule specific actions and processes. Ifa human user and robotic machine counterpart enter the mess hall which is not a combat zone, the machine learning system 1072 would need to understand that a different set of actions or scheduling processes occurs in this environment when instructing its robotic machine counterparts (or other assets) in the area.

In embodiments, the machine learning system 1072 may manage a coordinated team of human users of firearms and at least one machine. In this embodiment, the machine learning system 1072 may receive as inputs at least one sensory input about a human and at least one sensory input about a machine that is part of the team coordinated with the human. The machine learning system 1072 may then automatically, using machine learning, determine the occurrence of an event, such as a pre-discharge event, a discharge event, a post-discharge event (including a post discharge adverse event) or other events. Post discharge adverse events may include injury to the human or occurrence of damage to the machine, such as subsequent to the detection of a firearm discharge event by the system.

In embodiments, the firearm usage tracking system 800 may be or include an all-in-one communication device 1090. The system may integrate with a variety of other communication devices, such as camera systems 888 including body cameras, helmet cameras, heart rate monitors, physiological monitors, and messaging.

In embodiments, the firearm usage tracking system 800 may integrate with physiological monitors. A heart rate band or monitor can be an indicator of a distressed situation creating a notification.

In embodiments, the firearm usage tracking system 800 integrates with mobile phone technology. The system can send critical messages in a timely manner, such as through an app. The app may be directly connected to dispatchers, such as allowing the caller to request assistance.

In embodiments, the firearm usage tracking system 800 may provide a dashboard for the dispatcher. The dashboard may include communication and mapping features, such as to track the location of all weapons in real-time, to highlight relevant events (such as weapons being gripped, weapons being raised, or weapons that have been discharged). The dashboard may provide access information from other systems, such as making available camera views, such as ones that are triggered by activation of body cameras or on-site cameras from the firearm monitoring system or from the dashboard. In embodiments, the firearm usage tracking system 800 provides a dashboard for the supervisor. In embodiments, the dashboard includes the communication system and mapping technology to track the location of all weapons in realtime. In embodiments, the firearm usage tracking system 800 separates users into groups/echelons with designated permissions. In embodiments, the firearm usage tracking system 800 provides a dashboard for one or more of ground units, officers, military personnel, an investigator/compliance officer, and the like. The dashboard may include the communication system and mapping technology to track the location of all weapons in realtime.

In embodiments, the firearm usage tracking system 800 measures the parameters of the recoil and parameters of pre-shot movement. This allows an analysis of changes over time to determine the status of the weapon. The system can also capture movements and determine whether the user is handling the weapon properly.

In embodiments, the firearm usage tracking system 800 may alert the user should the weapon be pointed at another person with a tracking system. The firearm usage tracking system 800 may also alert the user should the weapon be pointed at another weapon, another deployed asset, another predefined target, raised quickly in a geo-defined zone, or the like. This may help avoid friendly fire (fratricide) situations.

In embodiments, the firearm usage tracking system 800 integrates with a virtual, augmented, or heads-up display (HUD) reality system 1092 including virtual, augmented reality, or HUD glasses. This integration can provide the user with vital information, including how many rounds of ammunition are left, such as based on tracking discharges over time and comparing to known characteristics of a weapon, such as the size of a magazine.

In embodiments, the firearm usage tracking system 800 includes predictive maintenance, such as determined by the number of shots taken. The system can alert when components need to be maintained or replaced.

In embodiments, the firearm usage tracking system 800 allows the number of shots fired to influence resale value of the firearm.

In embodiments, the firearm usage tracking system 800 includes predictive maintenance based on recoil parameters (e.g., showing degradation of performance as recoil patterns shift over time).

In embodiments, the firearm usage tracking system 800 includes a predictive resupply module 1094 based on the number of shots taken. In embodiments the firearm usage tracking system 800 indicates when ammunition needs to be re-supplied.

In embodiments, the firearm usage tracking system 800 accounts for inventory of rounds used with the predictive resupply module 1094 that tracks the amount of ammunition used and alerts when the inventory and shots fired do not match indicating a loss of ammunition.

Methods and systems are provided for the installation of grips. The fireguards can be removed to install the tracking system on to the rails.

In embodiments, the firearm usage tracking system integrates an IMU into a smart weapon (e.g., one with user authentication, such as based on a password or other code, or a biometric authentication system).

In embodiments, the firearm usage tracking system 800 includes a grip-located IMU for a connected firearms platform.

In embodiments, the firearm usage tracking system 800 integrates with artificial intelligence (AI) and Machine Learning. For example, AI can provide predictive ammunition resupply, such as measuring fire rates and accounting for delivery time of new ammunition.

In embodiments, the firearm usage tracking system 800 integrates with virtual reality (VR) or augment reality (AR) using, for example, a Microsoft® HoloLens® for training purposes. A virtual command center for a battlefield training session can be created.

In embodiments, the firearm usage tracking system 800 provides VR and AR grip installation. VR video can be used to identify the platform and provide instruction on removal and installation of grips and or other firearm parts.

In embodiments, the firearm usage tracking system 800 supplies data to an ARNVR system 1098 that included VR and AR headsets. This may allow users to monitor inventory, rounds left in the magazine, and other relevant data including a map of the environment and surrounding units and objective markers.

In embodiments, the firearm usage tracking system 800 can have customizable grips provided through 3D printing or other manufacturing processes. Each individual can customize a style, color, texture, portions of shapes, concavity and convexity to better fit in the hand, changing knurled surfaces, combinations of textures and colors and purposely different designs and configurations, etc. on one side the grip relative to the other or make them mirror images of each other.

In embodiments, the methods and systems disclosed herein provide benefits to a wide number of users, including without limitation private and commercial gun users. One such set of users comprises of managers of first responder and law enforcement personnel, such as police chiefs and elected officials that manage officers and dispatchers.

Detailed embodiments of the present disclosure are disclosed herein; however, it is to be understood that the disclosed embodiments are merely exemplary of the disclosure, which may be embodied in various forms. Therefore, specific structural and functional details disclosed herein are not to be interpreted as limiting, but merely as a basis for the claims and as a representative basis for teaching one skilled in the art to variously employ the present disclosure in virtually any appropriately detailed structure.

While only a few embodiments of the present disclosure have been shown and described, it will be obvious to those skilled in the art that many changes and modifications may be made thereunto without departing from the spirit and scope of the present disclosure as described in the following claims. All patent applications and patents, both foreign and domestic, and all other publications referenced herein are incorporated herein in their entireties to the full extent permitted by law.

The methods and systems described herein may be deployed in part or in whole through a machine that executes computer software, program codes, and/or instructions on a processor. The present disclosure may be implemented as a method on the machine, as a system or apparatus as part of or in relation to the machine, or as a computer program product embodied in a computer readable medium executing on one or more of the machines. In embodiments, the processor may be part of a server, cloud server, client, network infrastructure, mobile computing platform, stationary computing platform, or other computing platforms. A processor may be any kind of computational or processing device capable of executing program instructions, codes, binary instructions, and the like. The processor may be or may include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor, or any machine utilizing one, may include non-transitory memory that stores methods, codes, instructions and programs as described herein and elsewhere. The processor may access a non-transitory storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache, and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server, cloud server, and other variants such as secondary server, host server, distributed server, and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client, and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers, and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM, and the like. The processes, methods, program codes, instructions described herein and elsewhere may be executed by one or more of the network infrastructural elements. The methods and systems described herein may be adapted for use with any kind of private, community, or hybrid cloud computing network or cloud computing environment, including those which involve features of software as a service (SaaS), platform as a service (PaaS), and/or infrastructure as a service (IaaS).

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, program codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like, other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers, and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, methods described above and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

The use of the terms "a" and "an" and "the" and similar referents in the context of describing the disclosure (especially in the context of the following claims) is to be construed to cover both the singular and the plural unless otherwise indicated herein or clearly contradicted by context. The terms "comprising," "having," "including," and "containing" are to be construed as open-ended terms (i.e., meaning "including, but not limited to,") unless otherwise noted. Recitations of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiment, method, and examples, but by all embodiments and methods within the scope and spirit of the disclosure.

Any element in a claim that does not explicitly state "means for" performing a specified function, or "step for" performing a specified function, is not to be interpreted as a "means" or "step" clause as specified in 35 U.S.C. § 112(f). In particular, any use of "step of in the claims is not intended to invoke the provision of 35 U.S.C. § 112(f).

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A firearm including an integrated monitoring system, the integrated monitoring system comprising:
   a serial communication system;
   a microcontroller module coupled to the serial communication system and configured to transmit and receive data using the serial communication system;
   a motion monitor coupled to the microcontroller module and configured to determine a motion of the firearm using one or more sensors; and
   a global positioning system module coupled to the microcontroller module and configured to determine a location of the firearm in three-dimensional space;
   wherein the integrated monitoring system is integrated into a grip of the firearm; and wherein the integrated monitoring system further comprises:
      a force sensor coupled to the serial communication system, the force sensor configured to use electrical resistance to measure a force applied to the grip of the firearm, the force sensor further configured to generate a signal indicative of the measured force, wherein a device external to the firearm is activated based on the signal.

2. The firearm of claim 1, wherein the device external to the firearm is a body camera worn by a user of the firearm.

3. The firearm of claim 1, wherein the motion monitor is a nine-axis motion monitor, wherein the one or more sensors include a tri-axis gyroscope, a tri-axis accelerometer, and a tri-axis compass, which are used to generate sensor data indicative of a movement, orientation, and direction of the firearm.

4. The firearm of claim 3, wherein the microcontroller module includes a communication circuit configured to indicate the sensor data to a device external to the firearm.

5. The firearm of claim 4, wherein the device external to the firearm is a body camera worn by a user of the firearm, wherein the body camera is activated based on the indication of the sensor data.

6. The firearm of claim 1, wherein the integrated monitoring system further comprises:
   a data and power connection configured to receive data and power from a power source, wherein the serial communication system is coupled to the data and power connection.

7. The firearm of claim 6, wherein the power source is a wireless charging system.

8. A firearm including an integrated monitoring system, the integrated monitoring system comprising:
   a global positioning system module configured to determine a location of the firearm in three-dimensional space;
   a motion monitor configured to generate sensor data indicative of a movement, orientation, and direction of the firearm;
   a force sensor configured to use electrical resistance to measure a force applied to a grip of the firearm; and
   a communication circuit configured to communicate one or more of the location of the firearm in the three-dimensional space, the sensor data, or a signal indicative of the measured force applied to the grip to a device external to the firearm.

9. The firearm of claim 8, wherein the integrated monitoring system further comprises:

a sensor configured to detect a discharge of the firearm, wherein, responsive to the detection of the discharge using the sensor, the communication circuit communicates data indicative of the discharge to the device external to the firearm.

10. The firearm of claim 8, wherein the motion monitor is a nine-axis motion monitor, wherein the nine-axis motion monitor uses at least one of a tri-axis gyroscope, a tri-axis accelerometer, or a tri-axis compass to generate the sensor data.

11. The firearm of claim 8, wherein the integrated monitoring system further comprises:
   a data and power connection configured to receive the data from a data source and the power from a power source; and
   a regulator electrically coupled to the power source, the regulator configured to reduce a voltage from the power source from a first level to a second level, wherein the voltage is supplied at the second level to one or more of the global positioning system module, the motion monitor, or the force sensor.

12. The firearm of claim 8, wherein the device external to the firearm is a body camera worn by a user of the firearm, wherein the body camera starts recording video upon receiving a communication from the communication circuit.

13. The firearm of claim 1, further comprising:
   a communication circuit configured to communicate one or more of the location of the firearm in the three-dimensional space, the sensor data, or a signal indicative of the measured force applied to the grip to a device external to the firearm.

14. The firearm of claim 13, wherein the integrated monitoring system further comprises:
   a sensor configured to detect a discharge of the firearm, wherein, responsive to the detection of the discharge using the sensor, the communication circuit communicates data indicative of the discharge to the device external to the firearm.

15. The firearm of claim 13, wherein the integrated monitoring system further comprises:
   a data and power connection configured to receive the data from a data source and the power from a power source; and
   a regulator electrically coupled to the power source, the regulator configured to reduce a voltage from the power source from a first level to a second level, wherein the voltage is supplied at the second level to one or more of the global positioning system module, the motion monitor, or the force sensor.

16. The firearm of claim 13, wherein the device external to the firearm is a body camera worn by a user of the firearm, wherein the body camera starts recording video upon receiving a communication from the communication circuit.

* * * * *